(12) United States Patent
Cooke

(10) Patent No.: US 8,332,400 B2
(45) Date of Patent: Dec. 11, 2012

(54) SYSTEM AND METHOD FOR MANAGING WEB SEARCH INFORMATION IN NAVIGATION HIERARCHY

(75) Inventor: Timothy Bryan Cooke, Maple Valley, WA (US)

(73) Assignee: Sage Inventions, LLC, Maple Valley, WA (US)

( * ) Notice: Subject to any disclaimer, the term of this patent is extended or adjusted under 35 U.S.C. 154(b) by 329 days.

(21) Appl. No.: 12/557,367

(22) Filed: Sep. 10, 2009

(65) Prior Publication Data
US 2010/0114916 A1 May 6, 2010

Related U.S. Application Data

(60) Provisional application No. 61/099,532, filed on Sep. 23, 2008.

(51) Int. Cl.
*G06F 17/30* (2006.01)
(52) U.S. Cl. ...................................................... 707/731
(58) Field of Classification Search .................. 707/721, 707/713, 765–768
See application file for complete search history.

(56) References Cited

U.S. PATENT DOCUMENTS

| | | | |
|---|---|---|---|
| 5,421,008 A | 5/1995 | Banning et al. | |
| 5,911,138 A * | 6/1999 | Li et al. ................................ | 1/1 |
| 5,956,707 A | 9/1999 | Chu | |
| 6,208,985 B1 | 3/2001 | Krehel | |
| 6,282,537 B1 | 8/2001 | Madnick et al. | |
| 6,480,843 B2 | 11/2002 | Li | |
| 6,671,681 B1 | 12/2003 | Emens et al. | |
| 7,333,982 B2 | 2/2008 | Bakalash et al. | |
| 7,343,371 B2 | 3/2008 | Ibuki et al. | |
| 7,603,657 B2 | 10/2009 | Gassner et al. | |
| 7,756,849 B2 | 7/2010 | Bates et al. | |
| 7,853,574 B2 | 12/2010 | Kraenzel et al. | |
| 7,877,381 B2 | 1/2011 | Ewen et al. | |
| 2006/0064674 A1 * | 3/2006 | Olson et al. ................... | 717/113 |
| 2006/0224583 A1 * | 10/2006 | Fikes et al. ..................... | 707/6 |
| 2007/0143248 A1 | 6/2007 | Uppala | |
| 2007/0239682 A1 | 10/2007 | Arellanes et al. | |
| 2007/0239734 A1 | 10/2007 | Arellanes et al. | |
| 2007/0282828 A1 | 12/2007 | Ikenoue | |
| 2009/0100021 A1 * | 4/2009 | Morris et al. ..................... | 707/3 |

FOREIGN PATENT DOCUMENTS

| | | |
|---|---|---|
| JP | 05-204985 | 8/1993 |
| KR | 3054605 | 7/2003 |
| WO | WO 2005/057433 | 6/2005 |
| WO | WO 2007/079388 | 7/2007 |

* cited by examiner

*Primary Examiner* — Thu-Nguyet Le
(74) *Attorney, Agent, or Firm* — Miller Nash LLP

(57) ABSTRACT

The current methods and system create a plurality of tree text history entries in the tree text history section within the context of the search terms by associating with a plurality of history data from a plurality of searches using a plurality of search terms in a hierarchical format and allow users to manage the plurality of tree text history entries created in the tree text history section. The plurality of tree text history entries created in the tree text history section include a title and optionally a search or sub-search term. The current methods and system allow managing history data comprising the steps of adding, filtering, modifying, deleting, sorting, pruning, prioritizing, importing, and/or exporting the tree text history entries created in the tree text history section depending on user preferences.

33 Claims, 34 Drawing Sheets

SYSTEM AND METHOD FOR MANAGING WEB SEARCH INFORMATION IN NAVIGATION HIERARCHY

CROSS-REFERENCE TO RELATED APPLICATION

The present application is an application claiming the benefit under 35 USC Section 119(e) of U.S. Provisional Patent Application Ser. No. 61/099,532, filed Sep. 23, 2008. The present application is based on and claims priority from the provisional application, the disclosure of which is hereby expressly incorporated herein by reference in its entirety.

COPYRIGHT NOTICE

A portion of the disclosure of this patent document contains material that is subject to copyright protection. The copyright owner has no objection to the facsimile reproduction of the patent disclosure as it appears in the Patent and Trademark Office patent files or records, but otherwise reserves all copyright rights whatsoever.

BACKGROUND OF THE INVENTION

This specification describes generally a system and methods for integrating, viewing, updating, interacting, storing, using, importing, exporting, and managing web history search information from any web search engine or browser. More particularly, the specification describes a system and methods for access, review, management, retrieval, configuration, modification, and analysis of web search histories for prioritization and reusability.

The Internet has become a popular source and revolutionized the way in which information is transmitted, exchanged, retrieved, accessed, and searched. The World Wide Web (the "Web") enables any user to perform searches on the web over the Internet that contains a plethora of pages with different data information including text, images, sound, video, and other multimedia files provided through a globally connected network. The information in various data files is formatted on the web by viewable presentation to users by a standard page description language, the hypertext markup language ("HTML"). The Web pages thereby utilize HTML. Various Web pages are connected to one another through links or hyperlinks. The links within a Web page allow access or link to other Web resources that are identified by a universal resource identifier ("URI") or a uniform resource locator ("URL"). The Web environment allows data transaction using the hypertext transfer protocol ("HTTP") between server computers ("servers") and client computers ("clients"), operating on a client-server model. A client typically connects to a server, and the client contacts a Web server for requesting information. The client depends on the Web server for delivering data information and history data since information may reside on the servers. At the request of the client, the server can search, retrieve, and transmit data information back to the client.

A browser is a software that runs on a personal computer or client connected to the Web and looks at and interacts with all of the information on the Web. The client-server model allows a personal computer or client to run the browser in order to search the Web, and access various host servers around the Internet in executing search and retrieval functions. Moreover, the client-server model is analogous to an architecture with limitless file storage medium and databases from which any user can access information using the personal computer or client. A browser allows display of Web sites, Web pages, links/hyperlinks to other Web pages, and retrieves Web resources. Therefore, a browser is an application or software that is used to navigate or view data information in any distributed database such as the Internet or the Web.

Search engines have become widespread and valuable tools for searching and retrieving content information for users of the Internet through the Web. A search engine is basically a software program or Web site that is used for searching other databases and search engines, gathering information from the databases and search engines, and reporting information to the user. As content information of the Internet increases, search information increases as well, and the need to organize and manage Web search results in an easily searchable and hierarchical format becomes imperative.

Currently, mainstream browsers present web search results and history data as a linear concept, however, they have severe limitations in retrieving, understanding, and managing Web search results. For example, the forward and backward navigation buttons on the Web browser enable the users to go forward and backward to retrieve and view past Web pages from a limited, simple list of Web sites that were visited. By clicking on links from a Web page, forward and backward navigation paths are disrupted. History views of Web search results are poorly organized since it is difficult to perform sub-searches within an Internet search session without losing the initial context in which the search was performed. These inherent limitations are a major obstacle to storing, retrieving, integrating, saving, prioritizing, using, and managing Web search results. Furthermore, the process of deriving at certain search and sub-search results are not readily understood or history data stored for later use.

Instead of only having forward and backward navigation buttons on the Web browser to view a limited number of URLs from the search results in a linear fashion, there exists a need to store, retrieve, integrate, save, prioritize, import, and export Web search results for organization, context, and hierarchy. Further, there is a great need for a system and method by which Web search results and Web histories can be organized and managed in an advanced hierarchical manner, integrated with most Web search engines by using the hierarchical history and context menus, and saved by prioritization of Web histories and searches. Such a system would provide the capability to manage Web histories in a hierarchical manner, allow sub-searches within the search results without losing initial context, and provide context and reusability of search/sub-search results and Web histories by integrating with most Web search engines and currently available browsers.

BRIEF SUMMARY OF THE INVENTION

The current methods and system manage history data created in a hierarchical format from navigation on the Internet or Web with search and/or sub-search results for easy accessibility, reusability, export, import, and searchability of and within the history data. The current methods and system enable users to easily view and understand space and time within which at least one search and at least one sub-search within the context of the search are conducted.

The current methods and system create tree text history entries in an easily viewable tree format in a tree text history section with various levels that are hierarchical as a result of conducting searches and sub-searches, simultaneously receiving and associating the history data with the tree text history entries.

The current methods and system allow users to conduct at least one search and at least one sub-search via context menus for selecting search terms and/or sub-search terms within the context of the search terms. The tree text history entries created in the tree text history section include a title and optionally a search or sub-search term.

The current methods and system allow managing history data in a tree text history management system during a search by a user, comprising the steps of: (a) receiving at least one history data from the search using at least one search term; (b) automatically creating a tree text history entry in a tree text history section by associating with the at least one history data from the search; (c) repeating steps (a) through (b) by creating a plurality of tree text history entries in the tree text history section by associating with a plurality of history data from a plurality of searches using a plurality of search terms in a hierarchical format; and (d) managing the plurality of tree text history entries created in the tree text history section wherein the tree text history management system provides the user with the plurality of tree text history entries that are reusable, modifiable and manageable.

The current methods and system allow managing history data comprising the steps of adding, filtering, modifying, deleting, sorting, pruning, prioritizing, importing, and/or exporting the tree text history entries created in the tree text history section depending on user preferences. For every tree text history entry created within the tree text history section, an option to enter notes is available.

The current methods and system optionally display search results or sub-search results in a new window, new tab, or with options to refine the searches and sub-searches with advanced options such as adding phrases, exclusionary terms, page preferences, date preferences, and/or language preferences.

The tree text history management system has a memory storing a plurality of tree text history entries and a computer program for associating with the browser in continuously creating the tree text history entries from searches and/or sub-searches conducted.

The tree text history management system has a searchable option to search within the tree text history section containing a plurality of tree text history entries and within the history data.

The computer, the Internet, the Web are exemplary media that might be used in the present invention. In this exemplary embodiment, Web browsers are the platforms. Further, Web sites or pages are exemplary display content. More specifically, a participating Web site (or display content) can be visited by a user using a Web browser from the client.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

The accompanying drawings, which are incorporated in and constitute a part of this specification, illustrate various exemplary embodiments of the invention and, together with the description, explain the invention.

DETAILED DESCRIPTION OF THE INVENTION

Before describing the invention and the figures, some of the terminology should be clarified. Please note that the terms and phrases may have additional definitions and/or examples throughout the specification. Where otherwise not specifically defined, words, phrases, and acronyms are given their ordinary meaning in the art. Exemplary embodiments may be better understood with reference to the drawings, but these embodiments are not intended to be of a limiting nature.

Figure 4:
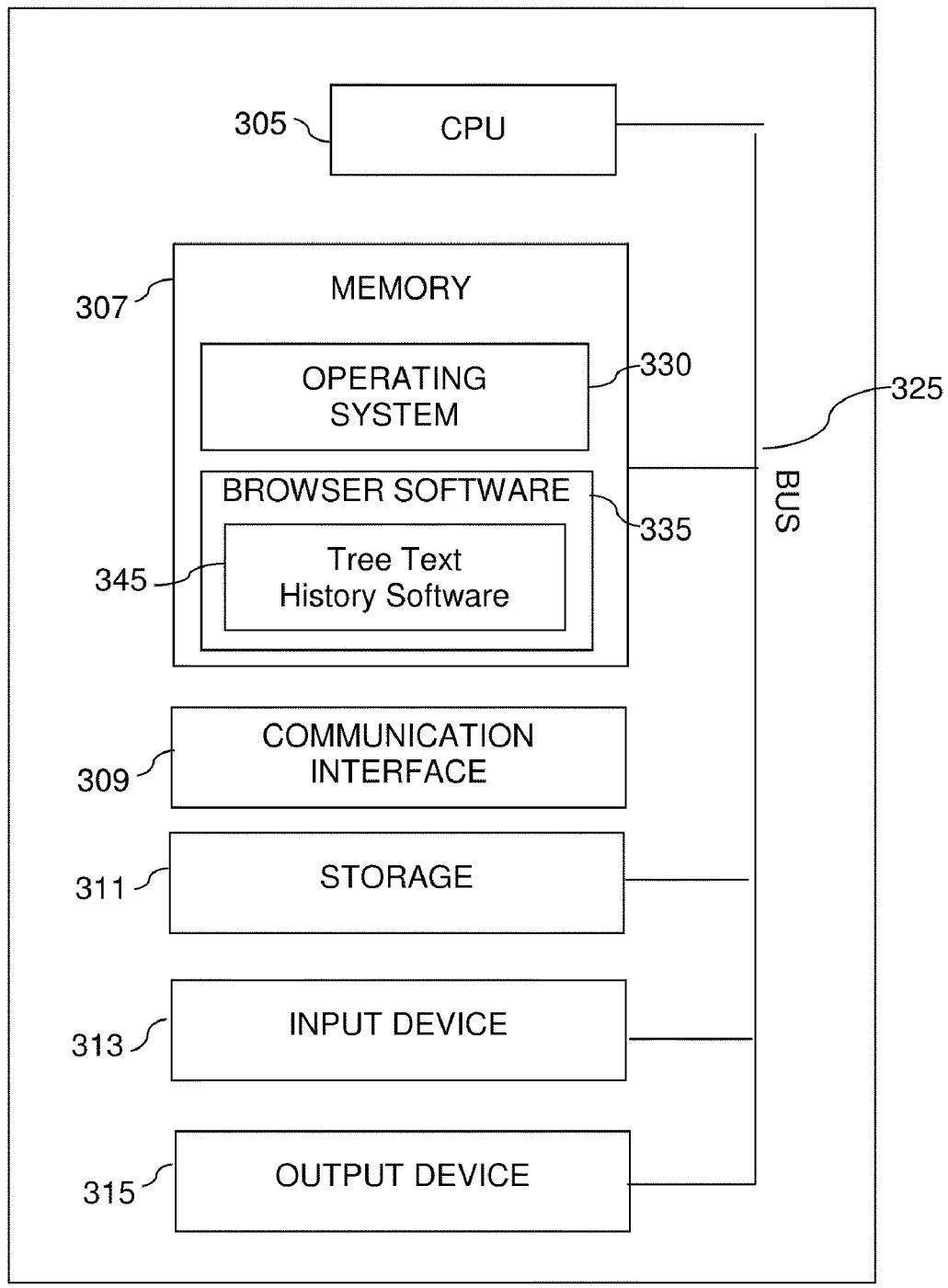
FIG. 4 is a diagram of a portion of an exemplary computer-readable medium that may be used by a client of FIGS. 2 and 3.

As used herein, "system" describes the combination of hardware and software to accomplish the tasks described herein. Exemplary systems are shown as system of FIG. 2. The core of the system is a tree text history management system that may be any type of software that is contained in memory as shown in FIG. 4 for storing, receiving, and creating tree text history entries in a tree and hierarchical format.

As used herein, "document" refers to any machine-readable and machine-storable work product. For example, a document may include an e-mail, a web site, a file, a combination of files, one or more files with embedded links to other files, a blog, a Web advertisement, a forum or news group posting, a business listing, an electronic version of printed text, and other similar data. For the Internet environment, a common document is a Web page. Documents may include textual information and embedded information such as meta information, images, hyperlinks, etc.) and/or embedded instructions within Web pages.

As used herein, "history data" refers to titles of Web sites or pages, URLs, URIs, and search as well as sub-search terms used in conducting searches or sub-searches. History data may also include any other information relating to users' behavior such as the number of visits, date, and time for any particular Web site or page visited. Additionally, history data may include any metadata such as keywords, description, and user input data. History data may also be interchangeably used with search results.

As used herein, "tree text history entry" refers to each nodal entry that is created in the tree text history section in accordance with a search or sub-search conducted by a user.

Each tree text history entry may be created at a first, second, third, fourth, fifth, n . . . level depending on the context from which a search and/or sub-search is conducted by a user. A set of tree text history entries refers to a family of tree text history entries created from a particular search conducted using certain search term(s) in context, and sub-searches further conducted within the search terms by adding, deleting, and/or modifying the context of the original search term(s). An "instance" refers to a single tree text history entry that is created at various sub-levels (i.e., first, second, third, fourth, and n . . . ). The tree text history entry is also referred to as an instance. The tree text history entry created within the left hand tree text history includes the title of the entry and the search terms for viewing the context.

As used herein, "context menu" refers to dialog boxes that pop up with search and/or sub-search terms allowing users to perform searches within context.

Exemplary embodiments of the present invention are directed to a system and method for managing history data created in a hierarchical format from navigation on the Internet or Web with search and/or sub-search results for easy accessibility, reusability, import, export, and searchability of and within the history data.

Figure 1:
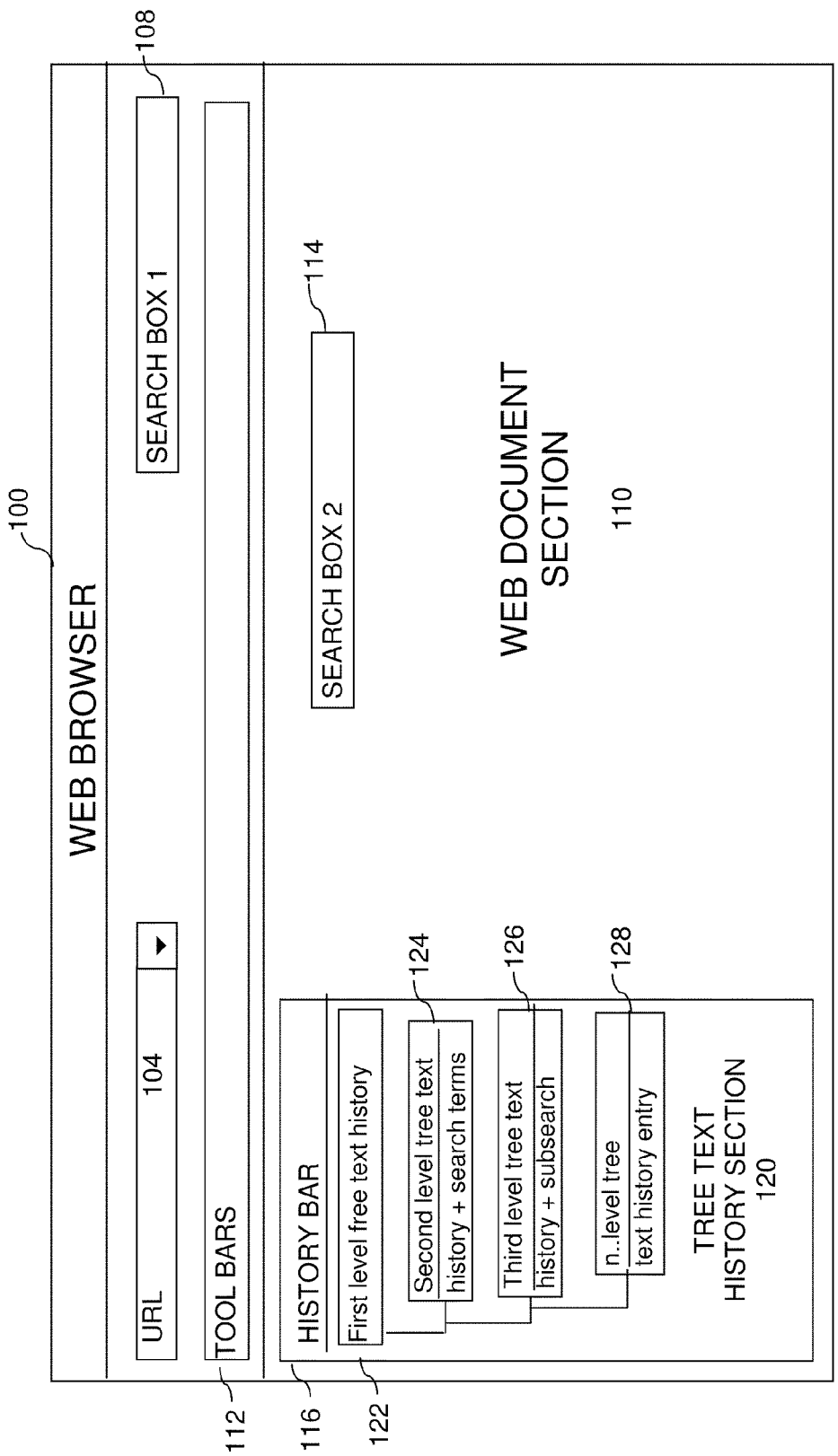
FIG. 1 is an exemplary diagram illustrating an embodiment of the invention and a concept consistent with the principles of the invention.

FIG. 1 is an exemplary diagram illustrating an embodiment of the invention and a concept consistent with the principles of the invention. As shown in FIG. 1, the tree text history section 120 located on the left hand portion containing tree text history entries with first, second, third, n . . . levels 122, 124, 126, 128 of search and sub-search results under the history bar 116 are displayed in a tree or hierarchical format. The different levels of tree text history entries may be associated with the search and/or sub-search results conducted by a user using a Web browser 100 that displays various Web documents in the Web document section 110 on the right hand portion. The first level of the tree text history 122 is established in the tree text history section 120 when a user enters the URL of a web site directly into the URL box 104 or when the designated Web home page automatically navigates the user to the Web home page. The second level tree text history 124 is created in the tree text history section as a result of a user conducting a search by using search terms. By searching from any search boxes 108, 114, whether from the browser or the search engine, the browser 100 transmits instructions to gather and retrieve search results based on the search term or terms. As soon as the search results are retrieved and displayed in the Web document section 110, the tree text history section 120 automatically receives the title and URL of the search results page and the search terms. Therefore, the tree text history section 120 creates the tree text history entry for the title or URL of the search results page along with the search terms as the second level of the tree text history entry 124. The tool bar section 112 contains typical tool bars for browsers such as front and backward buttons, refresh button, home page button, tab button, or other useful tool bars.

With continuing reference to FIG. 1, the next levels of tree text entries are created after the sub-search results are displayed on the Web document section 110 and simultaneously receiving the title of the sub-search results page and sub-search terms from the Web document section 110. Examples of creation of tree text history entries in the left hand tree text history section will be described in more detail and readily understood in exemplary embodiments as displayed in FIGS. 6A-6F and 12A-12H. The left hand tree text history section 120 may be approximately the same height as that of the right hand Web document section 110 for yielding maximum information and for easy viewing of the simultaneous creation of the tree text history entries while the Web document section displays different Web sites, pages, documents, or other search/sub-search results. The width of the tree text history section 120 may be expanded or decreased depending on the user's preferences.

Exemplary Network Configuration

Figure 2:
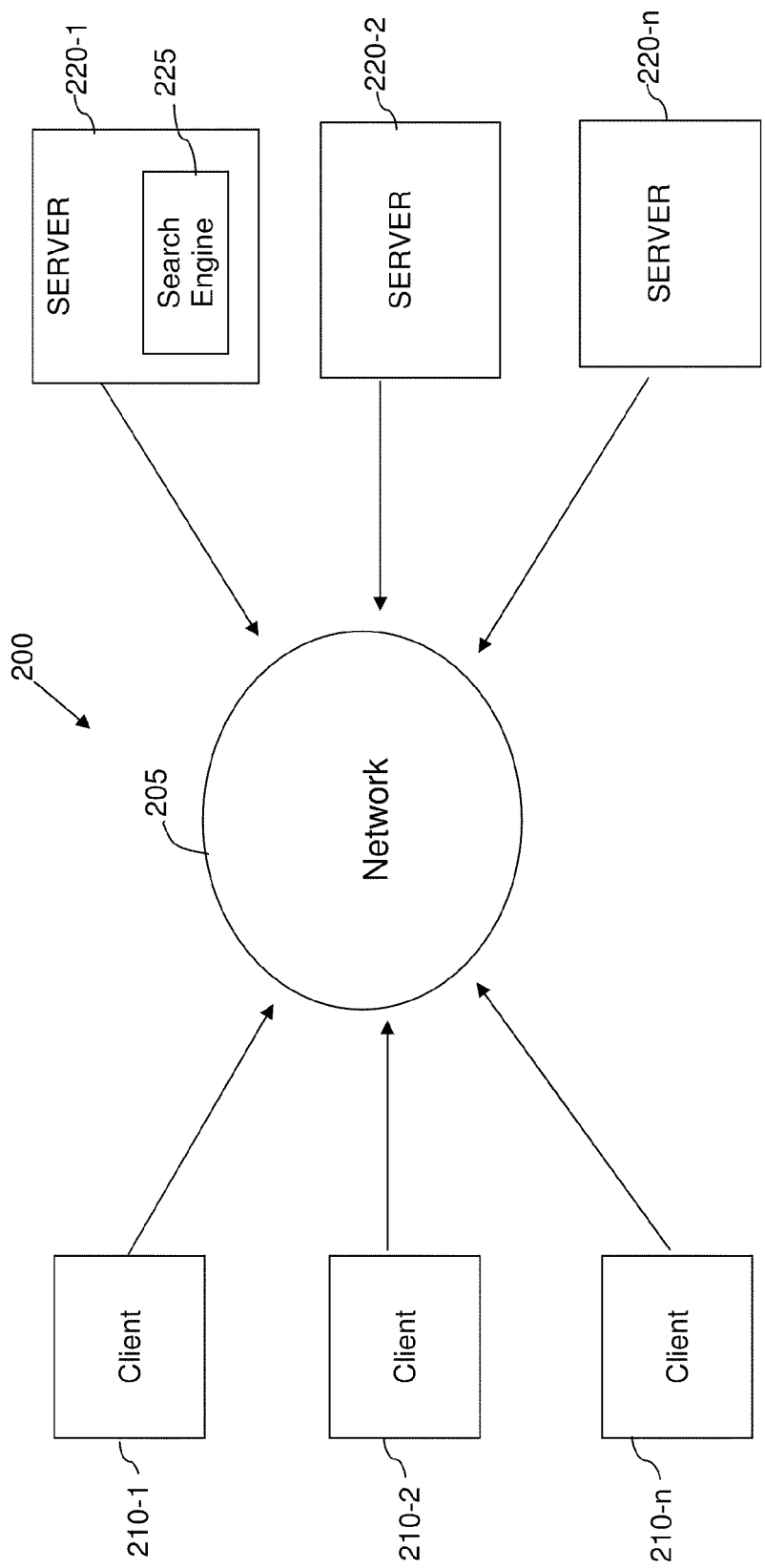
FIG. 2 is an exemplary diagram illustrating a network in which systems and methods consistent with the principles of the invention may be implemented.

FIG. 2 is an exemplary diagram illustrating a network structure 200 in which systems and methods consistent with the principles of the invention may be implemented. Various clients 210-1, 210-2, 210-n are connected to various servers 220-1, 220-2, 220-n via a network 205. Even though this particular embodiment of FIG. 2 displays only three clients 210 and three servers 220, there may be more or fewer clients 210 and servers 220 in implementation of the present invention, and the embodiment is not meant to be limiting. A client 210 can be any device such as a personal computer, a lap top, a personal digital assistant (PDA), a wireless telephone, or any similar type of communication or computation device. Servers 220-1, 220-2, 220-n typically include any similar devices that process, search, gather, store, index, and/or maintain Web documents and other files for use by the clients for browsing information. A search engine 225 may be available in each server 220-1, 220-2, 220-n. The network 205 may include, alone or in any suitable combination, a telephony network, a local area network (LAN), a wide area network (WAN), a dedicated intranet, wireless LAN, the Internet, an intranet, an extranet, a wireless network, a bus, or any other electronic or optical communication mechanisms for data interchange. Further, any suitable combination of wired and/or wireless components and systems may constitute networks. The network 205 may be implemented using bi-directional, uni-directional, or dedicated communication links. Clients 210-1, 210-2, 210-n and servers 220-1, 220-2, 220-n may connect to the network 205 via wired, wireless, optical, and/or any other similar data connections.

Exemplary Client/Server Architecture

Figure 3:
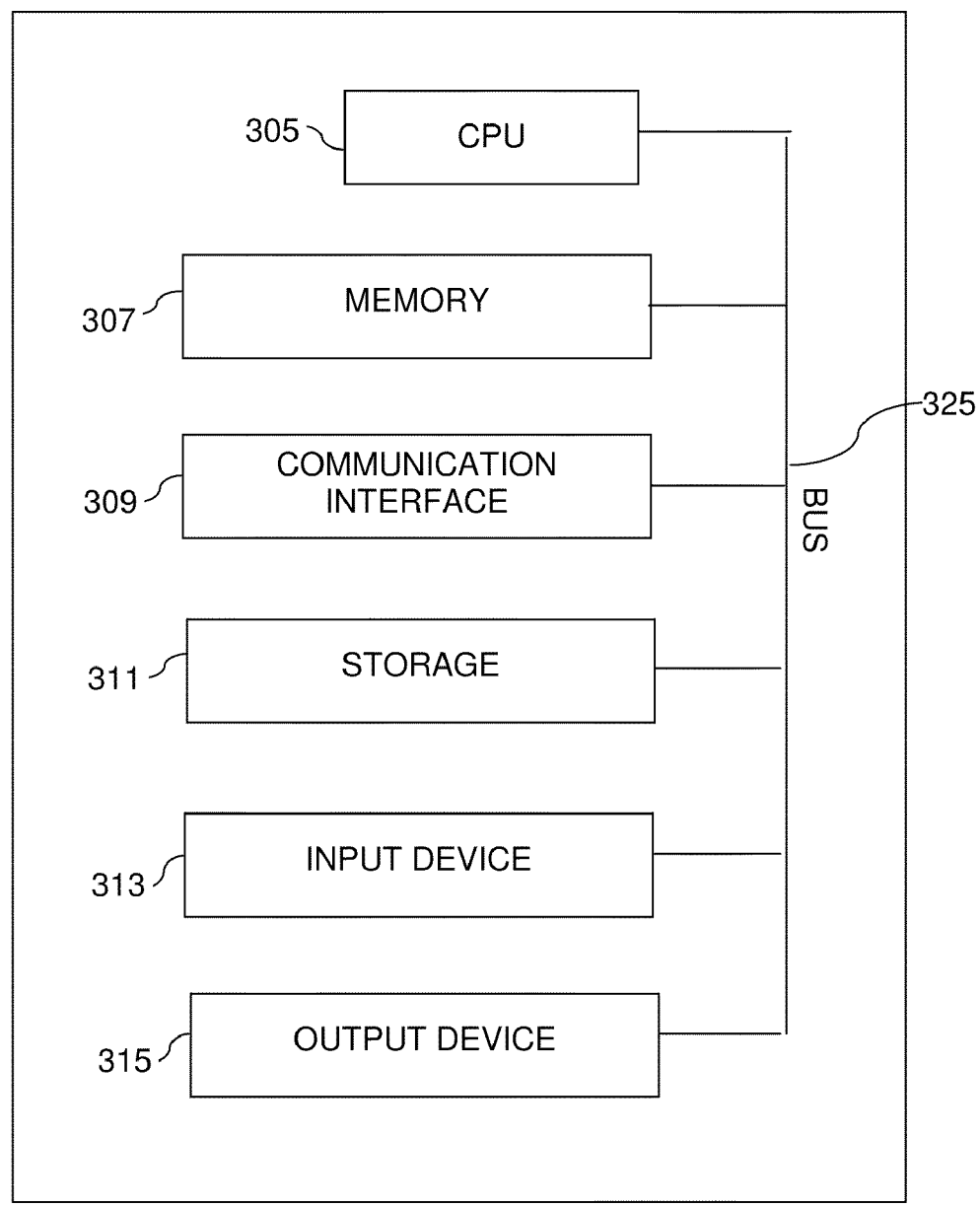
FIG. 3 is an exemplary diagram illustrating a client or server from FIG. 2.

FIG. 3 is an exemplary diagram illustrating a client 210 or server 220 that may correspond to one or more clients 210, and/or one or more servers 220. Although a specific hardware configuration is portrayed in the tree text history management system, embodiments of the present invention can apply to any hardware configuration that allows the browsing of Web documents from any multi-user computing system, a single-user computing station, or other devices. Generally, the tree text history management system includes at least one client 210 and at least one server 220. The client 210 and the server 220 may be components of the same computing system or may be separate components that are connected via a network 205. As previously described, the network 205 may comprise, alone or in any suitable combination, a telephony network, a LAN, a WAN, a dedicated intranet, wireless LAN, the Internet, an intranet, an extranet, a wireless network, a bus, or any other electronic or optical communication mechanisms for data interchange.

The client 210 or server 220 from FIG. 2 typically includes a central processing unit (CPU) 305 that is connected to memory 307, communication interface 309, storage 311, input device 313, and output device 315 via a bus 325. The bus 325 may include a communication path among the various components of the clients 210 or servers 220. Memory 307 is a random access memory or another type of dynamic storage memory device that is sufficiently capable of holding and executing the software and data structures of the present invention. A communication device 309 may be optionally incorporated into the client or server that may include any transceiver-like mechanism enabling the client 210 or server 220 to communicate with other devices and/or systems. An input device 313 may be any device that allows a user to input information to the client 210. For example, an input device 313 may comprise a keyboard, touch screen, keypad, mouse, button, track ball, voice recognition, or other similar input products. The output device 315 may be a screen, display, printer, speaker, or other similar output product that is separate from the input device 313 or works together with the input device 313 for outputting information to users.

Technical Implementation

FIG. 4 is a diagram of a portion of an exemplary computer-readable medium that may be used by a client 210 of FIGS. 2 and 3 for implementing the present invention. The client 210 and/or server 220 may perform certain search-related operations in response to the CPU 305 executing program instructions contained in a computer-readable medium, such as memory 307. The software instructions may be read into memory 330 from another computer-readable medium, such as a data storage device or from another device via the communication interface 309. The software instructions contained within the client 210 or server 220 may cause the CPU to perform certain processes as described later in more detail. The implementations herein are not limited to any specific combination of hardware circuitry and software.

The following paragraphs provide exemplary details of methods by which the present invention may be implemented. Even though one or more clients are shown to implement the tree text history software 335 as a browser add-on or a component of the browser software 335 for seamless integration with the browser, the present invention may be implemented in several different ways. In another exemplary embodiment, the present invention may be implemented as a frame or box that is included within the Web browser window. In another exemplary embodiment, the tree text history software 345 may be an extension of the browser such as a browser plug-in. Alternatively, the tree text history software 345 may be an application that is external to the browser. For example, the tree text history software is a proxy server. Further, an alternate method includes implementing the present invention as an external program that connects and hooks into the browser via communication methods. In another alternative embodiment, the tree text history component can be a selectable object embedded within a Web document that is currently displayed within a Web browser window or a function included within a frame within a Web browser window. Another alternate method implements the present invention by browser wrapper or hosting. For example, browsers allow embedding of the tree text history software 345 within a process or user interface to create a browser without a full implementation of creating a new browser. Another alternate method by which the present invention may be implemented include creating a new browser that is not integrated with the existing browser. It should be appreciated to those skilled in the art that in yet other embodiments, other mechanisms that may or may not be integrated within a browser may be used without departing from the spirit of the present invention.

Figure 5:
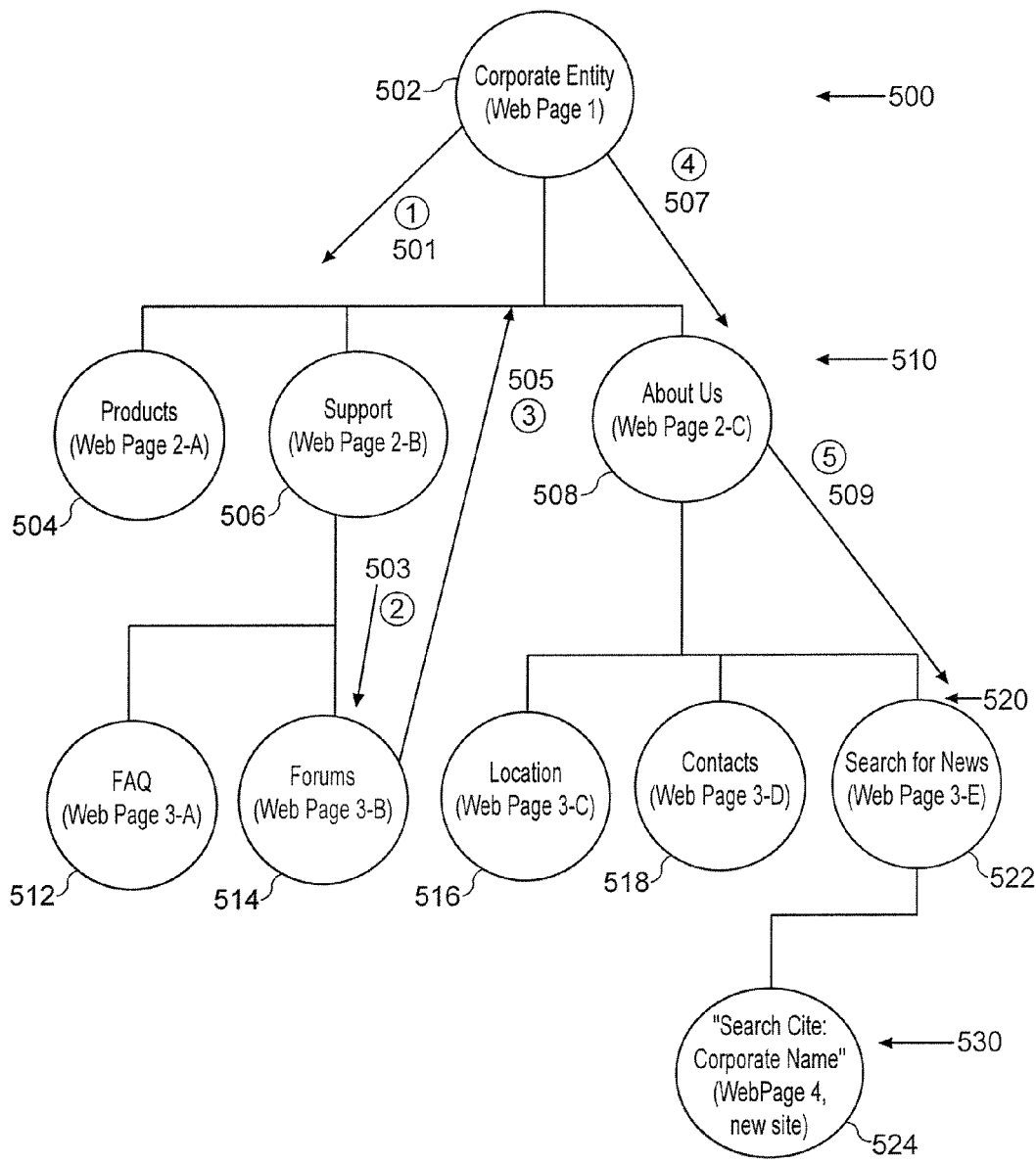
FIG. 5 an exemplary diagram illustrating an embodiment of the invention and a hierarchical concept consistent with the principles of the invention.

FIG. 5 is an exemplary diagram illustrating an embodiment of the invention and a hierarchical concept consistent with the principles of the invention. Current mainstream browsers in existence present history and search/sub-search results as a linear concept. For example, forward and backward navigation buttons are provided in the tool bar section 112 from the browser 100 in FIG. 1 for listing the Web sites visited in a linear fashion. However, Web browsing and navigating is not a linear process, but a hierarchical process by which a user navigates through different document pages and also within the given Web document for subordinate links without losing initial context of the original search. Therefore, FIG. 5 illustrates an embodiment of the hierarchical process by which the history data from the searches and sub-searches can be used, tracked, saved, stored, sorted, searched, filtered, and/or managed. FIG. 5 illustrates an exemplary corporate Web site with various levels 500, 510, 520, 530 of hierarchy to be searched and sub-searched within the corporate Web site. For example, a user may find a Web site and visit Web page one 502 of "Corporate Entity" of the exemplary corporate Web site at the first level 500. In step one 501, the user visits web page 2-B of "Support" 506 at the second level 510 from Web page 1 of "Corporate Entity" page 502. In step two 503, the user visits Web page 3-B of "Forums" 514 at the third level 520 within the Web site and decide to return to the main Web page 1 of "Corporate Entity" page 502 as shown in step three 505. In step four 507, the user then visits Web page 2-C of "About Us" page at the second level 510 and in step five 509, to visit web page 3-E of "Search for News" page at the third level 520 within the Web site. The search results not only included visiting the Web site of the "Corporate Entity," however, navigating at different levels 500, 510, 520, 530 within the Web site as a hierarchical process rather than as a linear process.

Figure 6A:
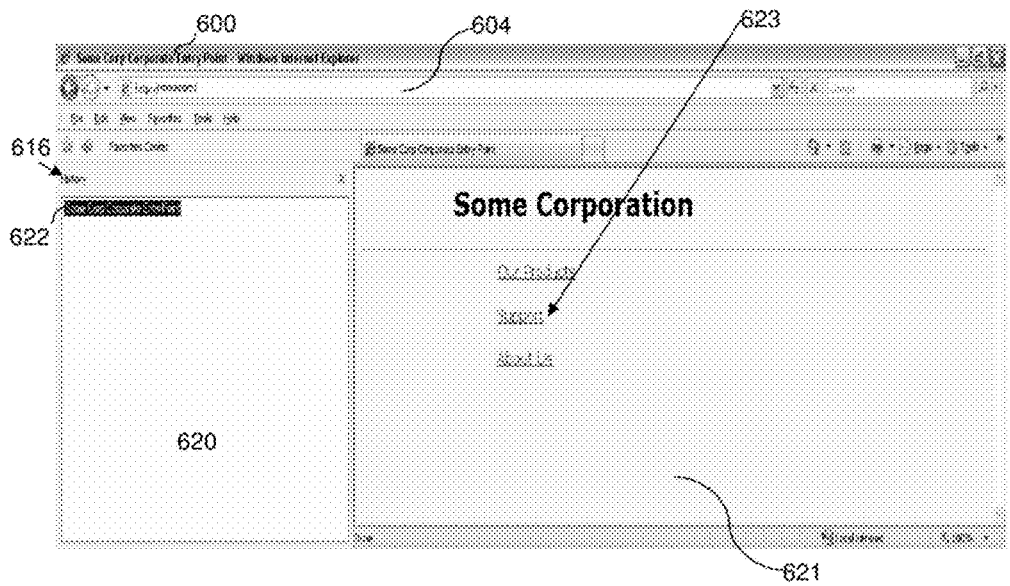
FIGS. 6A through 6H are screen shots illustrating an exemplary embodiment of implementing the steps of the invention from FIG. 5.
Figure 6B:
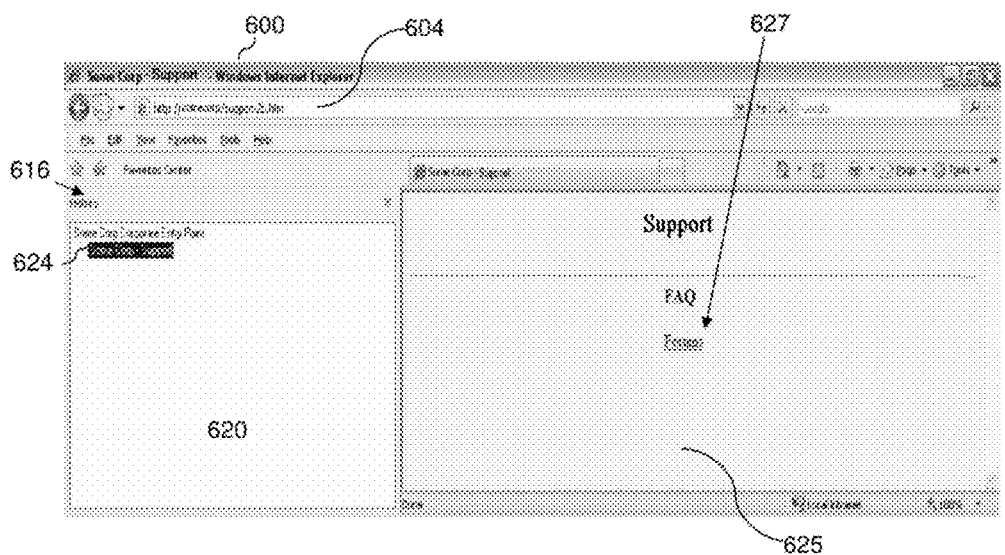
Figure 6C:
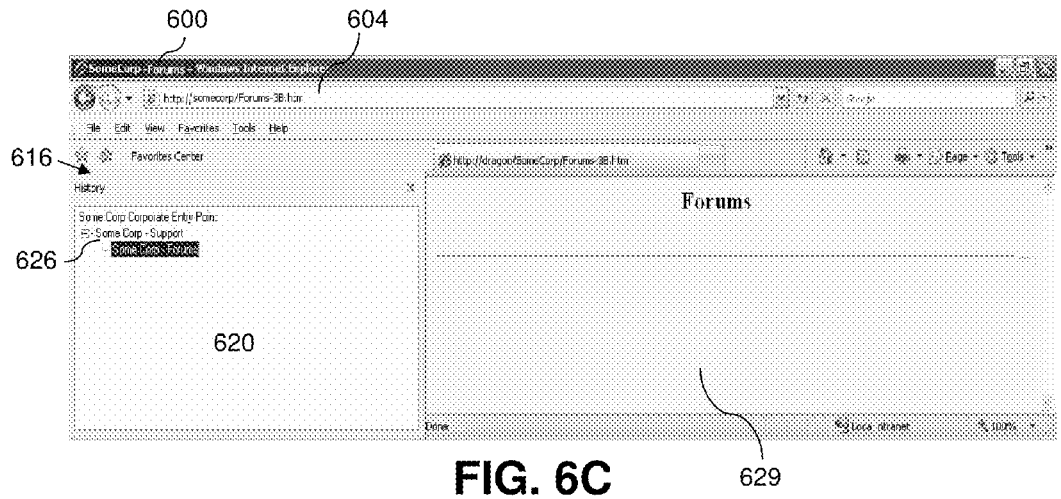
Figure 6D:
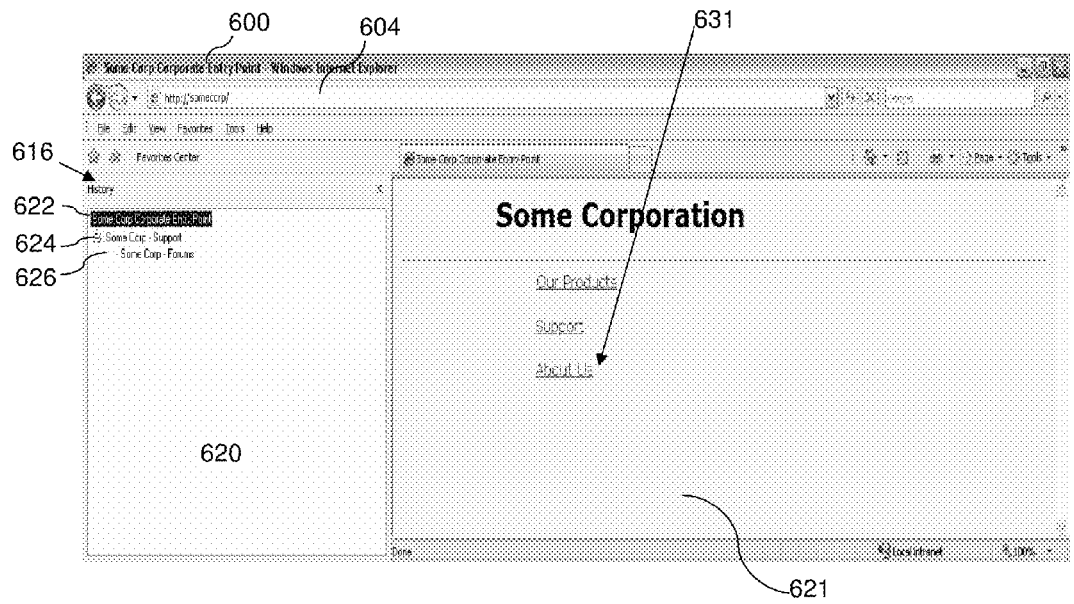

FIGS. 6A through 6F are screen shots illustrating an exemplary embodiment of implementing the steps of the invention from FIG. 5. By visiting an exemplary corporate Web page as described in FIG. 5, the left hand portion of the tree text history section 620 creates the first level of the tree text history 622 for the corporate page 621 or portal as shown in FIG. 6A. As in step one 501 of selecting the Web page 2-B for "Support" 506 from FIG. 5 or the "Support" link 623 from corporate page 621, the "Support" page 625 is displayed and directs a user to the "Support" page 625 in the right hand Web document portion 621 of FIG. 6B. The tree text history section 620 receives the title of the "Support" page and creates the "Some Corp-Support" entry as a second level tree text history entry 624 underneath the first level corporate page entry of "Some Corp Corporate Entry Point" 622 as shown in FIG. 6B. In FIG. 6C, a user selects Web page 3-B for "Forums" 514 or the "Forums" link 627 from the "Support" page 625, as in step two 503 of FIG. 5, at which time the right hand Web document section 110 naturally displays and directs the user to the "Forums" page 629. Simultaneously, the tree text history section receives the title of "Some Corp-Forums" and creates the third level of tree text history entry of "Some Corp-Forums" 626 in the left-hand tree text history section 620 underneath the second level of tree text history entry of "Some Corp-Support" 624 because the "Support" link was selected from the "Forums" page 629. In step three 505 of FIG. 5, the user decides to return to the main Web page 1 of the "Corporate Entity" 502 or the first level tree text entry of "Some Corp Corporate Entry Point" 622 by selecting the first level tree text entry of the corporate Web page created within the left hand, tree text history section 620. As illustrated in FIG. 6D, upon selection of the first level tree text history entry of the "Some Corp Corporate Entry Point" 622 from the left hand tree text history section 620, the Web document section 110 displays and directs the user back to the original Web corporate page 621. As shown in FIG. 6D, the first level of the tree text history entry of the "Some Corp Corporate Entry Point" 622 is highlighted due to selection by the user in the left hand tree text history section 620.

Figure 6E:
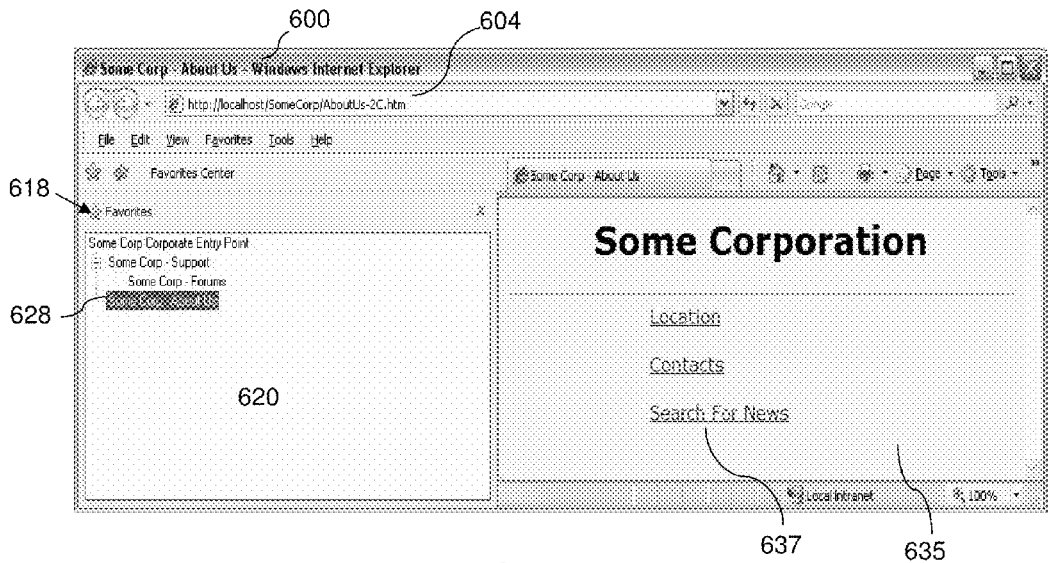
Figure 6F:
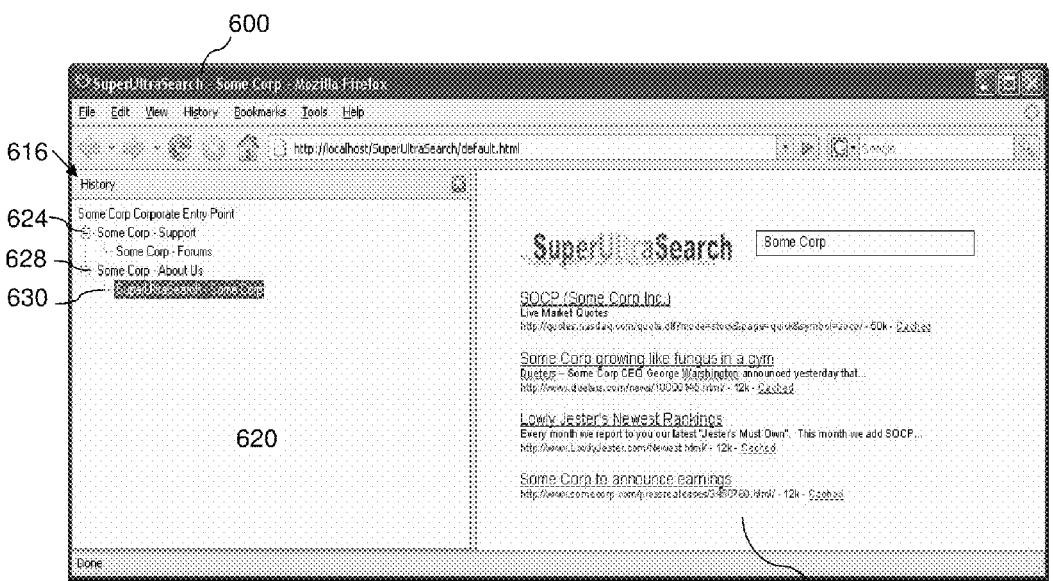

As in step four 507 of FIG. 5, the user selects the Web page 2-C for "About Us" 508 or the "About Us" link 631 from the main "Corporate Entity" page 621 within the right hand Web document section 110. In FIG. 6E, the right hand Web document section 110 then automatically displays and directs the user to the "About Us" page 635. The tree text history section receives the title of the "About Us" page 635 and creates a new second level tree text history entry of the "Some Corp-About Us" 628 underneath the tree text history corporate page entry providing hierarchical levels of tree text history from navigating within the exemplary corporate Web site. The second level tree text entry of "Some Corp-About Us" 628 is at the same second or hierarchical level as the second level entry of "Some Corp-Support" 624 since these two entries 624, 628 are at the same sub-search, second level. As in step five 509 of FIG. 5 and FIG. 6F, the user decides to select the Web page or the link for "Search for News" 637 from the "About Us" page 635 at which time the right hand Web document section 110 automatically displays and directs the user to the "Search for News" page 639 as displayed in FIG. 6F. Simultaneously, the left hand tree text history section receives the title of "Search for News" and creates another third level tree text history entry of the "SuperUltraSearch-Some Corp" 630 underneath the "Some Corp-About Us" entry 628. Therefore, the creation of different tree text history entries in a hierarchical process in accordance with navigation search and sub-search results allows users to know exactly where and when within the Web space and time the search and sub-search results have occurred.

Generally, the tree text history entries are created depending on and correspond to the level at which the search and/or sub-search are conducted, and titles of such search and/or sub-search results are received. The first level entries most likely represent the title or URL of the first search result page. The subordinate second level entries most likely represent the title or URL with or without search and/or sub-search terms if the link/hyperlink selections are made within and from the first level search result pages. The subordinate third level entries most likely represent the title or URL with or without search and/or sub-search terms if link/hyperlink selections are made within the second level search result pages. Creation of n level entries continue until a search and sub-search within the context of the search are completed.

The present invention of the tree text history management system provides users with an ease to navigation and allows users to combine high levels of information density with provision of space and time information during Web or Internet navigation and searches. Therefore, navigation and direction to a new Web page via each different link is singly treated as a different instance or tree text history entry in the hierarchy yet collectively created within the context of a search. For example, by either typing in a new URL or Web page, or automatically pulling up a saved home Web page allows creation of a new instance thereby providing a new tree text history entry of level one in the left hand tree text history section 120, 620. Typically, the tree text history entries are created simultaneously as navigation occurs, and the tree text history section keeps the lastly created tree text history entry in view or is highlighted. Instead of returning to the top of the tree text history entry every time a new instance or tree text history entry is created within the tree text history section, the view and highlighted portion of the last tree text history entry is stayed for continuity of search and consistency with respect to space and time within the navigation context.

The tree text history entries are generally automatically created with the title of the Web page selected or directed to. The tree text history entries also include the search and/or sub-search terms entered or used after the title of the page. By default, the tree text history entries may be named to use the titles of Web pages or URL visited if no title is provided. However, users can easily modify the tree text history entries that are automatically created by changing the setting. For example, in FIG. 5, the last tree text entry created in the tree text history section illustrates the tree text history entry with the title "SuperUltraSearch-Some Corp" 630 because the user has selected the "Search for News" link 637 from the "About Us" page 635. The title of the Web page 639 in the right hand Web document section 110 is "SuperUltraSearch" of "Some Corp." and this title is used by the tree text history section 620 to create the tree text history entry as a third level tree text history entry 630. Optionally, users may modify the names of the individual tree text history entries by customizing the titles, particularly if the Web page title or URL is confusing to the users.

The tree text history entries that are created within the tree text history section 120, 620 are easily sortable via user options or preferences. Despite the hierarchy of different levels of tree text history entries created for a set or different sets of tree text history entries created, it is easy to sort the tree text history entries within a given hierarchical set of tree text history entries as well as between sets of instances created for separate searches. For clarification, a set of instances created generally refers to a plurality of tree text history entries created at various levels for at least one search and/or at least one sub-search. For example, FIGS. 6A-6F illustrate a set of instances or a plurality of tree text history entries created for "Some Corp Corporate Entity Point." The tree text history entries, whether among sets of instances or within a set of instances, can be sorted according to the most visited pages, most recently visited pages, first visited pages, lastly visited pages, by priority, or by alphabetical order. For example, any URL entries that start with "http://" without a title are sorted under "h" rather than being sorted by the titles.

Another feature of the tree text history management methods and system enables users to manage the tree text history entries created in the tree text history section 120, 620 after the searches and/or sub-searches are performed. For example, users may select any set of instances in the tree text history section 120, 620 for collapsing or opening the sub-search entries of tree text history entries created within a specific level of tree text history entry or within any set of instances for simple viewing without having to expand all the sub-search entries. Users may also prune the tree text history entries by deleting any instance of the tree text history entries that are created but are not relevant for later use. Optionally, any sub-search entries created at any level underneath the first level of the tree text history entry can further be pruned by modifying, deleting, sorting, or renaming the tree text history entries to reduce complexity and organize the tree text history. At user's options or preferences, any of the pruning functions implemented as described previously can be undone as to return to previous positions or pages so as to not lose any inadvertent pruning actions.

After pruning by sorting, modifying, deleting, filtering, and organizing the Web sites and/or URLs visited according to user preferences and priority, the tree text history entries with different levels may be integrated and stored within the lists of favorites or history function. This feature allows integrating the history function with the tree text history management system. Under the history bar 616, 1016 (as shown in FIG. 12) or favorites bar 618, 1018 (as shown in FIG. 12), the tree text history management system provides recalling the sub-search results and pages by selecting from any tree text history entries created in the tree text history section 120, 620 as instances at various levels. By selecting or clicking on any tree text history entry saved and stored in the tree text history section 120, 620 under the history bar 616, 1016 or favorites bar 618, 1018, users may select any tree text history entry of interest to retrieve a Web site or a particular Web page within the Web site by viewing the context information. Therefore, the tree text history entries created in the left hand tree text history section 120, 620 can be modified, prioritized, deleted, saved, sorted, and/or stored for tree text history entries management. Users can denote important Web sites or pages by marking it as high, medium or low, and alternatively prioritize based on a numeric scale as later shown in FIG. 12H.

Additionally, a history management dialog box, window, or page is provided to allow users to further sort, search, filter, examine, and use the tree text history entries. Since the number and size of tree text history entries and history data can be large, users may search within the tree text history entries or within imported/exported history data by setting one or more criteria, including but not limited to Web page content, by date lastly accessed, by date first accessed, by title of history data and/or Web page, ranking, priority, page date, URL, Notes content and other similar properties.

Another exemplary feature of the tree text history methods and system includes adding notes to any of the instances of tree text history entries created from search and/or sub-search results conducted and received. For example, a user may return to and select the "Some Corp-Support" tree text history entry at the second level 624 from FIG. 6F. After selecting the "Some Corp-Support" tree text history entry 624 from the tree text history section 620, a user may select via a right-click menu box or context menu from which the options of adding, editing or deleting notes appears to the user. The user can then optionally select to add, edit or delete a note pertaining to the "Some Corp-Support" page for future reference. For example, by selecting the "add" option from the context menu, a blank box for entering simple text is displayed for the user to add notes. The size of the text box may be fairly large in size to enter at least two paragraphs of notes in simple text.

Another exemplary feature of the tree text history methods and system includes integrating the tab functionality with the tree text history entries. For example, every time a user creates a plurality of instances or tree text history entries for a new Web site or page in the tree text history section 120, 620, the Web document portion 110 may provide a new tab for the new Web site or page visited instead of using the same tab for displaying a certain Web site or page. For example, a first tab provides the first set of instances for a first Web site. For the first Web site in a first tab, sub-levels of second, third, fourth, and/or n levels of instances or tree text history entries are created under the first level tree text history entry for sub-searches conducted within the first Web site or page as a first set of instances. A second tab provides a second set of instances of a second or different Web site or page according to yet a different or second set of instances. For the second Web site in a second tab, sub-levels of second, third, fourth, and/or n levels of instances are created under the first level tree text history entry for sub-searches conducted within the second Web site or page. Each tab creates its own tree text history entries or set of instances. Therefore, the tab functionality within a browser accommodates different sets of instances for the different Web sites or documents to be implemented into its respective tab for easy navigation. Any number of tabs may be adopted to accommodate the present invention for searching in as many Web sites are necessary to finish conducting a search for a particular topic.

Another exemplary feature of the tree text history methods and system includes saving, pruning, and storing the tree text history entries created for future use in any research purposes. The tree text history entries can be saved as automatically named tree text history entries, modified names, or by file names. Further, a playback functionality allowing recreation of search and sub-search results and navigation process can be recorded and viewed at a somewhat accelerated pace by the tree text history management system. For evaluating the tree text history statistics, options such as creating a bar chart with frequency by site or adding a timer for the time spent on visiting a particular site can also be implemented.

The tree text history management system is integratable and workable with the currently existing browsers. More specifically, the tree text history management system integrates with the standard forward and backward buttons of mainstream browsers by supporting standard browser behavior. For example, the standard forward and backward buttons of mainstream browsers can be used to move back and forth within the various levels and sets of the tree text history entries that are created. Upon selecting the forward button as many times as a mainstream browser allows, the user can go forward to all the different Web sites or portions of Web sites visited while a highlighted portion over the selected tree text history entry moves downward simultaneously with the forward button action. In other words, the tree text history section view will synchronize with the forward button function. By pressing or clicking the forward button, this action simultaneously highlights the appropriate Web site or URL of the tree text history entry by moving in a downward direction. The highlight continues to move in a downward direction by continual clicking of the forward button because the forward button function is synchronized with the highlight of the corresponding tree text history entry.

Upon pressing or clicking the backward button as many times as a mainstream browser allows, the user can go backwards to the different Web sites or URLs visited while a highlighted portion over the corresponding tree text history entry moves upward simultaneously with the backward button action. In other words, the tree text history section view will synchronize with the backward button function. By pressing or clicking the backward button, this action simultaneously highlights the appropriate Web site or URL of the tree text history entry by moving in an upward direction. The highlight continues to move in an upward direction by continual clicking of the backward button because the backward button function is synchronized with the highlight of the corresponding tree text history entry.

Figure 6G:
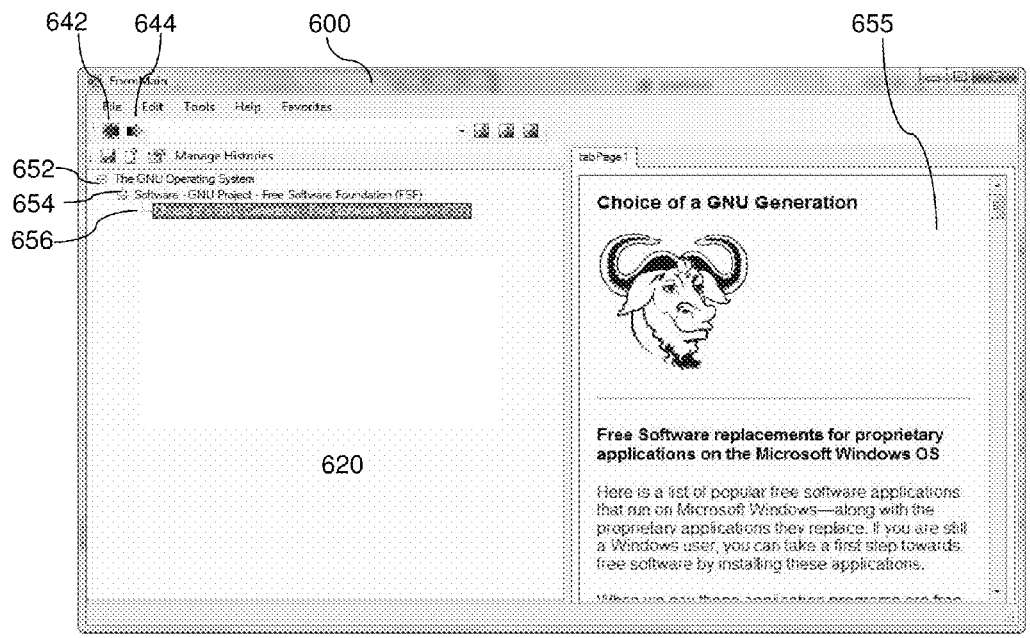
Figure 6H:
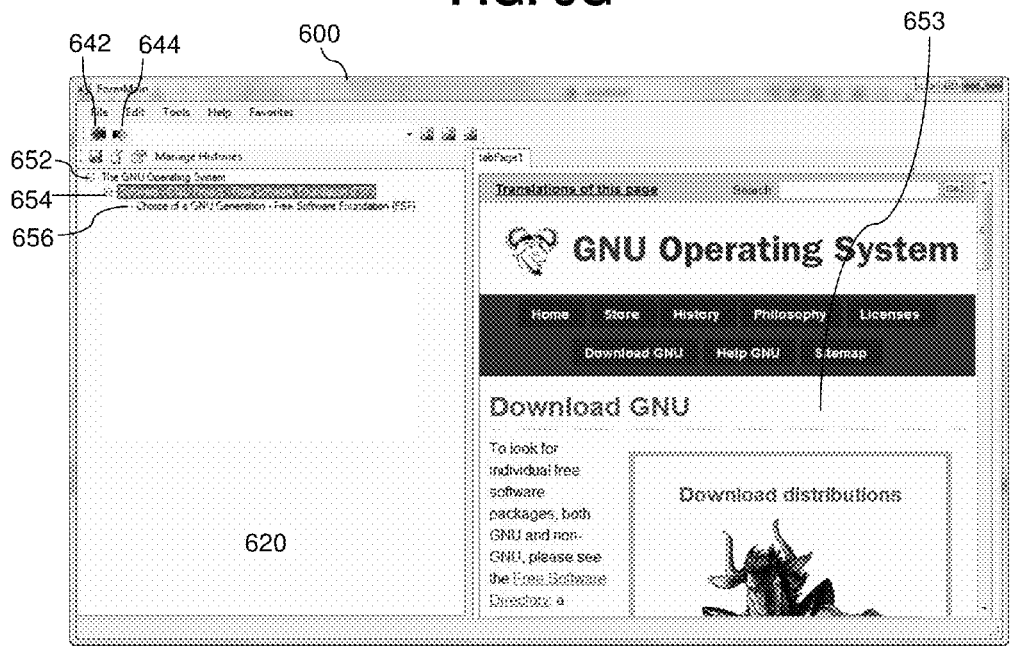

As illustrated in FIGS. 6G and 6H, exemplary forward button 642 and backward button 644 are displayed in the browser 600. Currently, the Web document section displays the Web document for "Choice of a GNU Generation" 655. When the user clicks the backward button 642, the highlight from the tree text history entry of "Choice of a GNU Generation-Free Software Foundation (FSF)" created at the third level 656 moves upward in the tree text history section 620 to the previous tree text history entry of "Software-GNU Project-Free Software Foundation (FSF)" at the second level 654 by synchronizing with the backward button function. Simultaneously, the Web document or page for "Software-GNU Project-Free Software Foundation (FSF)" 653 is displayed in the Web document section that corresponds to the highlighted tree text history entry 654 on the left.

The limitation of the forward and backward button function of the mainstream browser is that only a certain number of sites already visited are stored in the browser. However, the tree text history section 620 allows a user to select and move arbitrarily within the tree text history section 620 without being limited to the number of recorded Web sites as currently allowed by the forward and backward button function. Alternatively, the forward and backward button function may include allowing users to move forward and backward without being limited to a standard number, i.e., such as ten Web sites or URLs, and synchronizing with all of the already-created tree text history entries in the tree text history section 620. Therefore, the forward and backward button function allows users to go back and/or forward by synchronizing with any number of the Web sites or URLs that are created as tree text history entries in the tree text history section 620. Without having the standard limit of a specific number of URLs and/or Web sites as imposed by standard browsers, the users are not likely to lose track of the clicks and/or linkages from the forward and backward function. By using this alternative mode, the forward and backward button function is strictly based on keeping track of all the history with context in terms of space and time.

By using tree text history entries, titles, and data information from the Web sites visited, the tree text history management system provides users with an option to gather, export and/or import the files, related data/content, and bibliographical information for research purposes and later use. Users may have the option of saving and storing either all or a portion of the tree text history entries on the Web site or exporting and/or importing the tree text history entries for back-up and sharing the tree text history entries. Users may also have the option of exporting and/or importing all of the information displayed from a visited site or only a selection of content information displayed from the visited site for later use.

Exporting such data information and/or files include but are not limited to simple text such as CSV (i.e., Comma Separated Variable), Text, Microsoft One Note®. Exporting and/or importing such data information and/or files may also be in XML (i.e., eXtensible Markup Language) formats. Since users already have the history data, it may be useful to export all available bibliographical and citation information for the history data. Exporting of bibliographical and citation information is therefore useful in formats commonly used for scholarly research papers such as XLS (i.e. eXtensible Style Language), MLA/CSE/APA (i.e. Modern Language Association/Council of Science Editors/American Psychological Association, BibTeX (i.e. tool and file format used to describe and process lists of references, mostly in conjunction with LaTeX documents), online research management, writing & collaboration tools such as RefWorks, EndNote, or other similar formats for future use. It is typical for Web page bibliographical information to include data such as the page title, URL, and the date on which the Web page is accessed. For users searching the Internet for articles, scholarly journals, and/or research papers for a given topic, this unique feature of gathering, importing, and exporting tree text history entries from search and sub-search results for later use provides the users with a critical tool for conducting searches on the Web, analyzing, and managing the tree text history entries and their content information from the conducted searches. Searching within the exported data information is also possible allowing users to search within the history data.

Additionally, a separate WebChronicle™ Web site as a service provider, that is specifically created to organize, save, store, and manage the tree text history entries and all associated data information, is easily integratable so that saving, storing, and managing tree text history entries can occur from the WebChronicle™ Web site without users having to export, import, organize, and/or manage their own search and sub-search results. The WebChronicle™ service makes it possible for users to compare, rank, prioritize, search, and/or save tree text history entries based on searches and sub-searches when it is necessary to obtain the search and sub-search results.

Rather than merely viewing the history data in a linear list of Web sites visited, the tree text history management methods and system provide users with the capability to search, organize, select, save, and store not only the history of sites visited but to manage the Web sites and data information from the Web sites that are collected from the searches conducted in a hierarchical process. Therefore, tree text history entries, history data and content data may be organized, exported, and stored for future use. Optionally, the tree text history section 120, 620 may be searched by entering search terms to provide users with searching capabilities within the tree text history entries since the number and size of the tree text histories may become large.

For every tree text history entry within the tree text history section 120, 620, a user may select any of the tree text history entries created and enter further information via a right-click menu box or properties menu from which at least the following options of properties including but not limited to "User title," "Title," "URL," "Number of times visited," "Date/time first visited," "Date/time last visited," and "Notes" appear to the user for further selection. Users may select any of these properties to review information such as "User title," "Title," "URL," "Number of times visited," "Date/time first visited," "Date/time last visited," and to enter, edit, and/or delete notes. By selecting "Notes", users may add relevant notes and remarks regarding a specific tree text history entry for keeping track of the search process, providing reasons for selecting certain tree text history entries, and making notes of the quality of the tree text history entries and for content retrieved.

Figure 7:
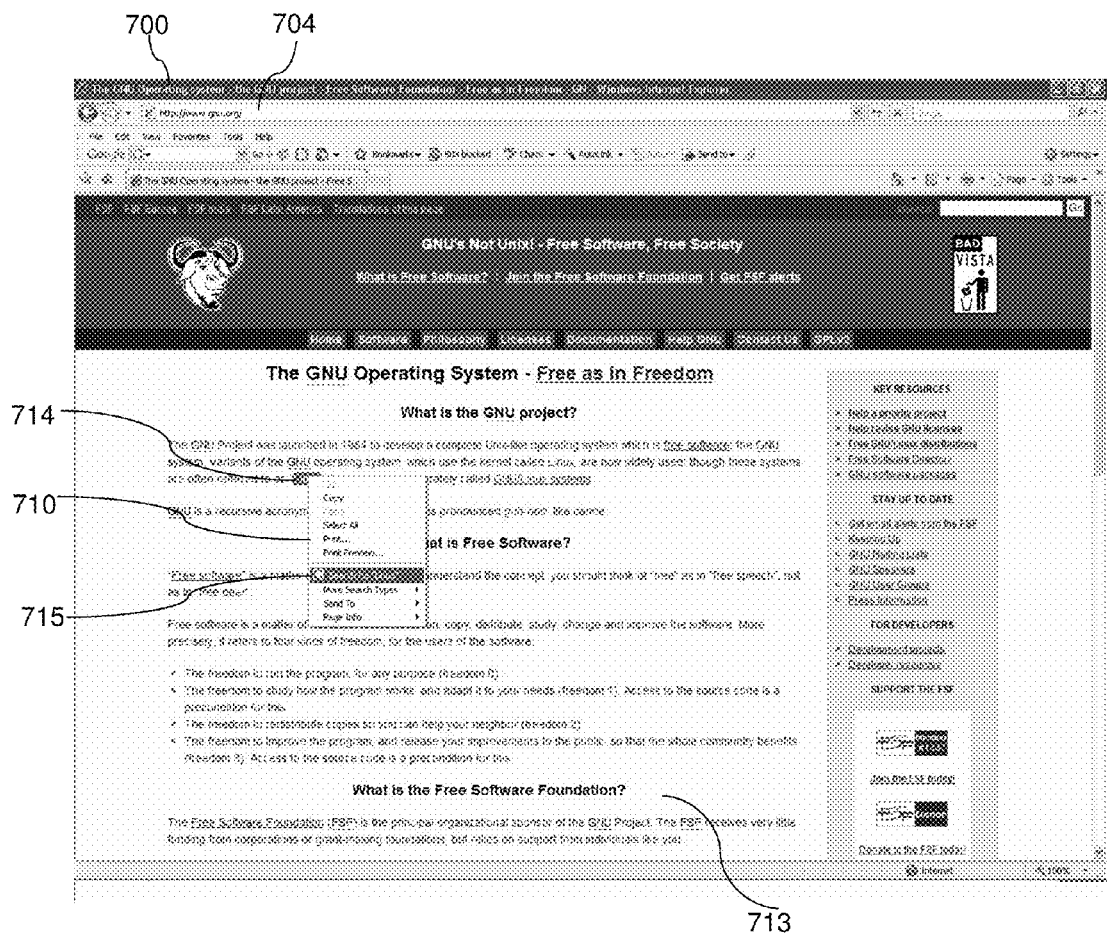
FIG. 7 is a screen shot illustrating an exemplary embodiment of the invention and search options.

FIG. 7 is a screen shot illustrating an exemplary embodiment of the invention and search options. By visiting a Web site, in this case the GNU Web site is used for exemplary purposes, the GNU Web site 713 is displayed as shown in FIG. 7 in the Web document section 110. For example, as demonstrated in FIG. 7, certain text within the Web site, such as the term "Linux", is selected (shown as highlighted) 714 in FIG. 7. After selecting the text for "Linux," users can further right click on the text of "Linux" resulting in the context menu 710 with an option to select 'Search for "Linux"' 715 as illustrated in the pop-up, context menu 710 next to the text of "Linux 714." Upon selecting "Search for 'Linux'" 715 from the context menu 710, the Web document section automatically displays and directs the user to the "Linux" page at which time a new search term of "Linux" is sent to the tree text history section 120, 620 from which a new instance of "Linux" entry is created. From the "Linux" page displayed in the Web document section, users may further conduct sub-searches with additional search terms. Alternatively, another search can be conducted if "Linux" did not result in satisfactory search results from which sub-searches may be further conducted. By conducting a new search using a new search term other than "Linux" and not using the sub-search results within the context of "Linux," a second set of instances or tree text history entries with its first level tree text history entry is created in the tree text history section 120, 620, and the context is reset to the new search term. Furthermore, for sub-searches conducted from the results or within the page as a result of the new search term within a second set of instances, second, third, and/or n . . . levels of tree text history entries are created as the second set of instances.

Figure 12A:
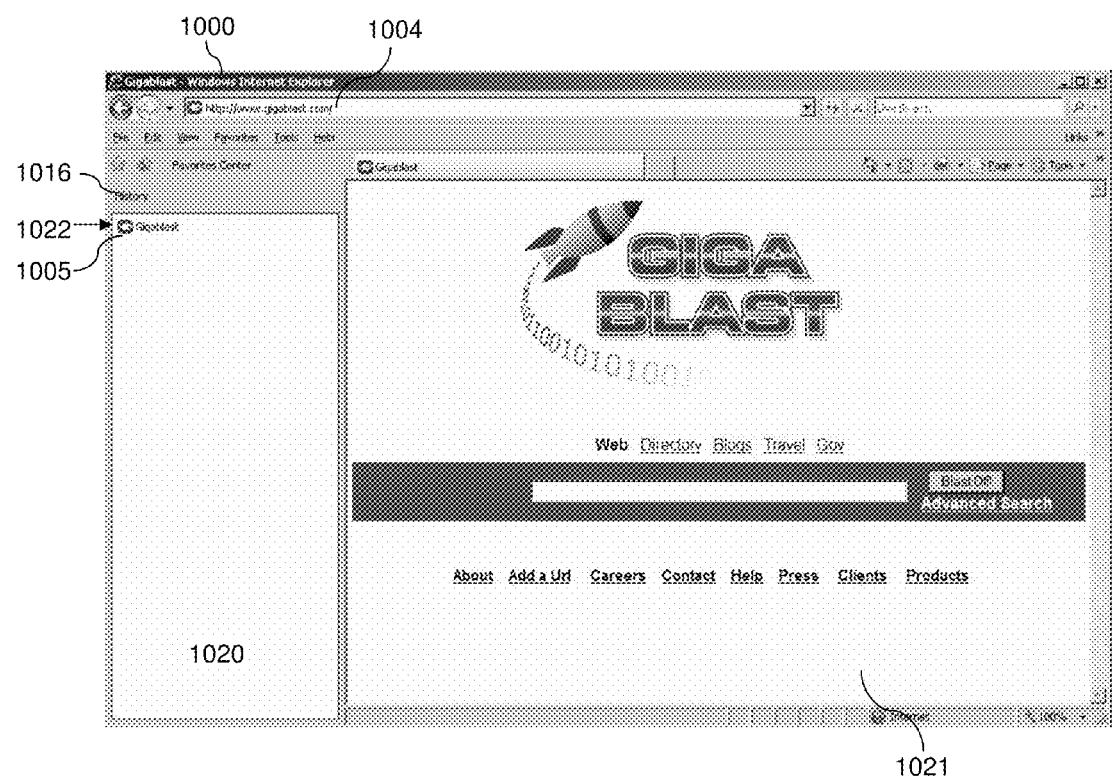
FIGS. 12A through 12H are screen shots illustrating an exemplary embodiment of implementing the steps of and consistent with the principles of the invention.
Figure 12B:
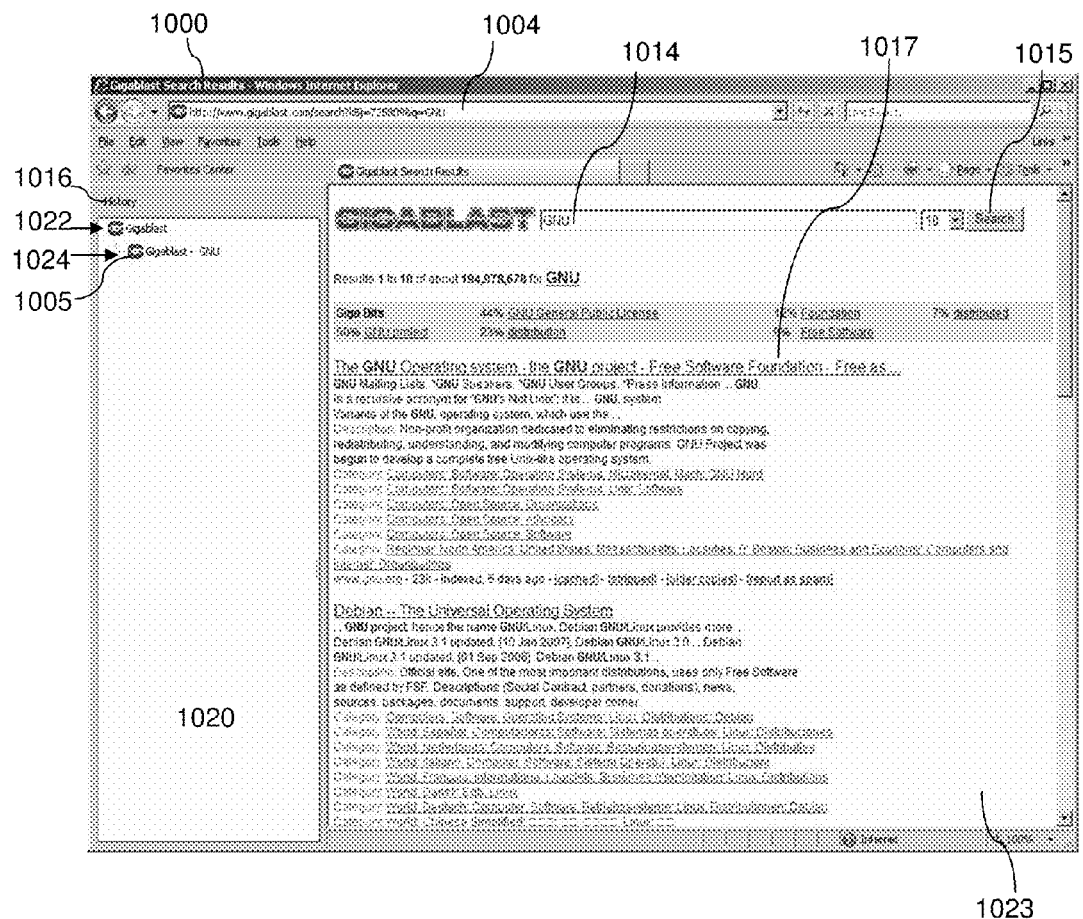
Figure 12C:
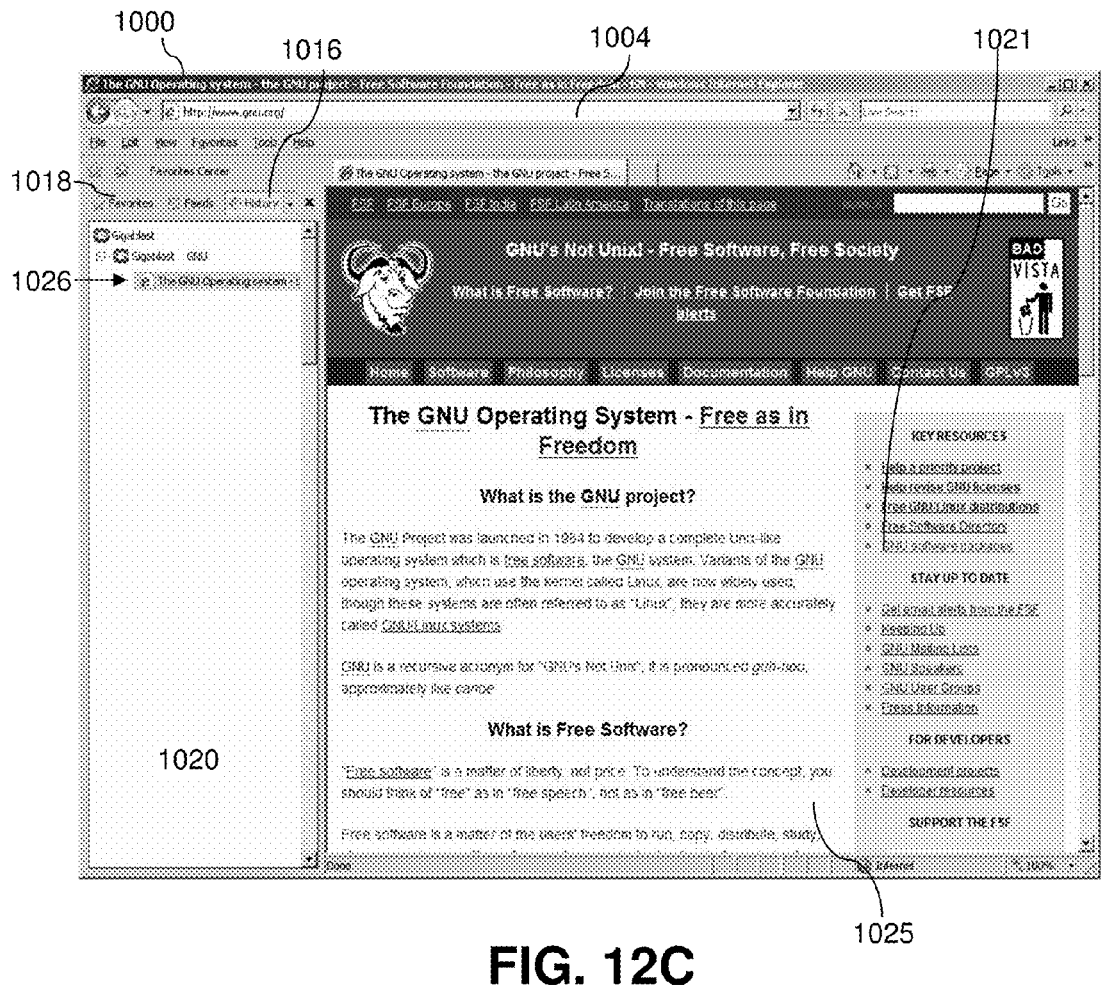
Figure 12D:
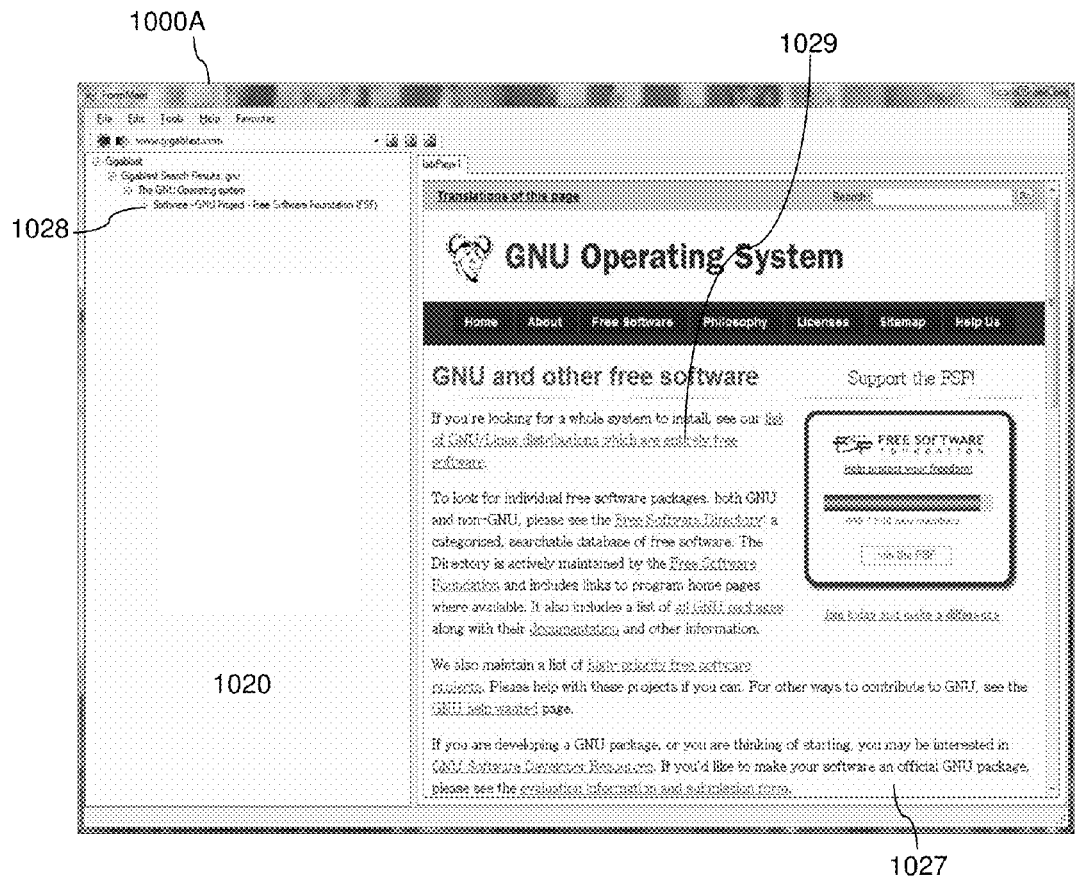
Figure 12E:
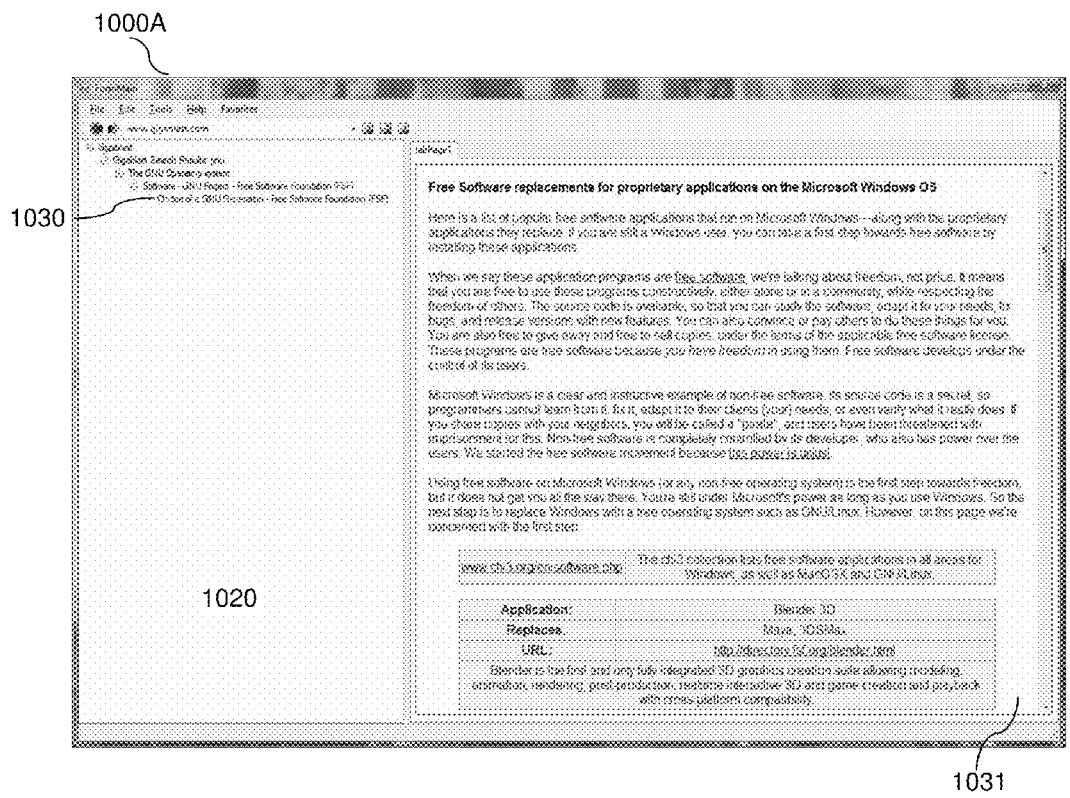
Figure 12F:
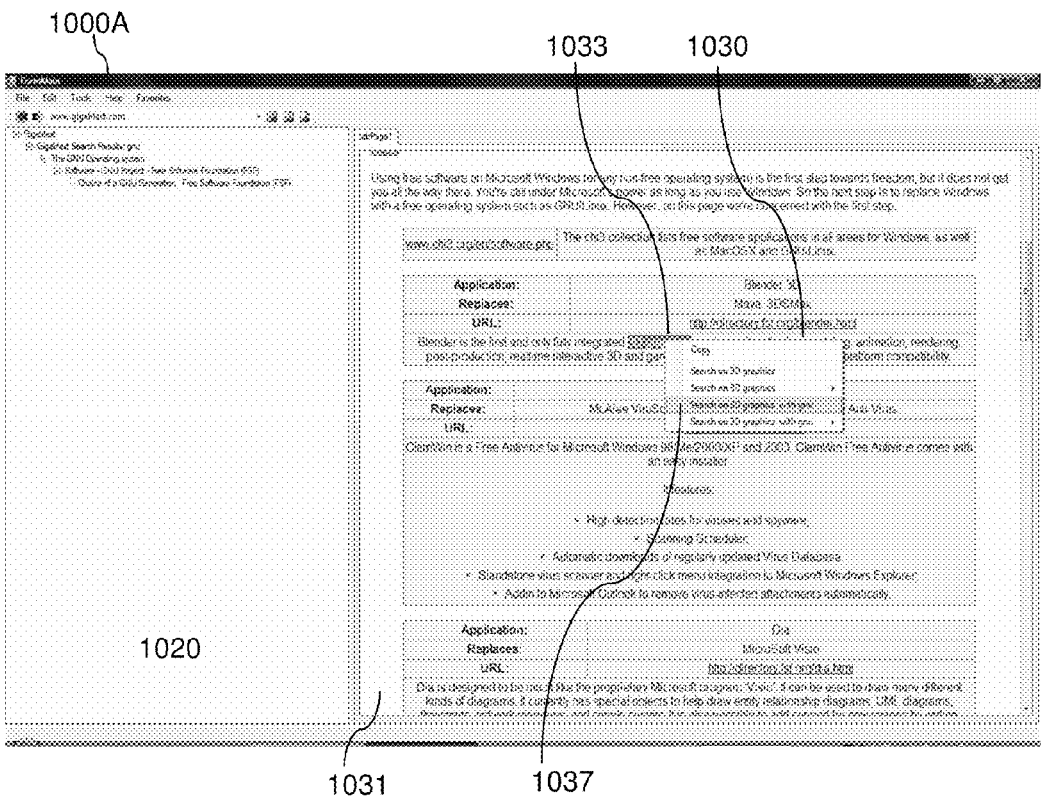
Figure 12G:
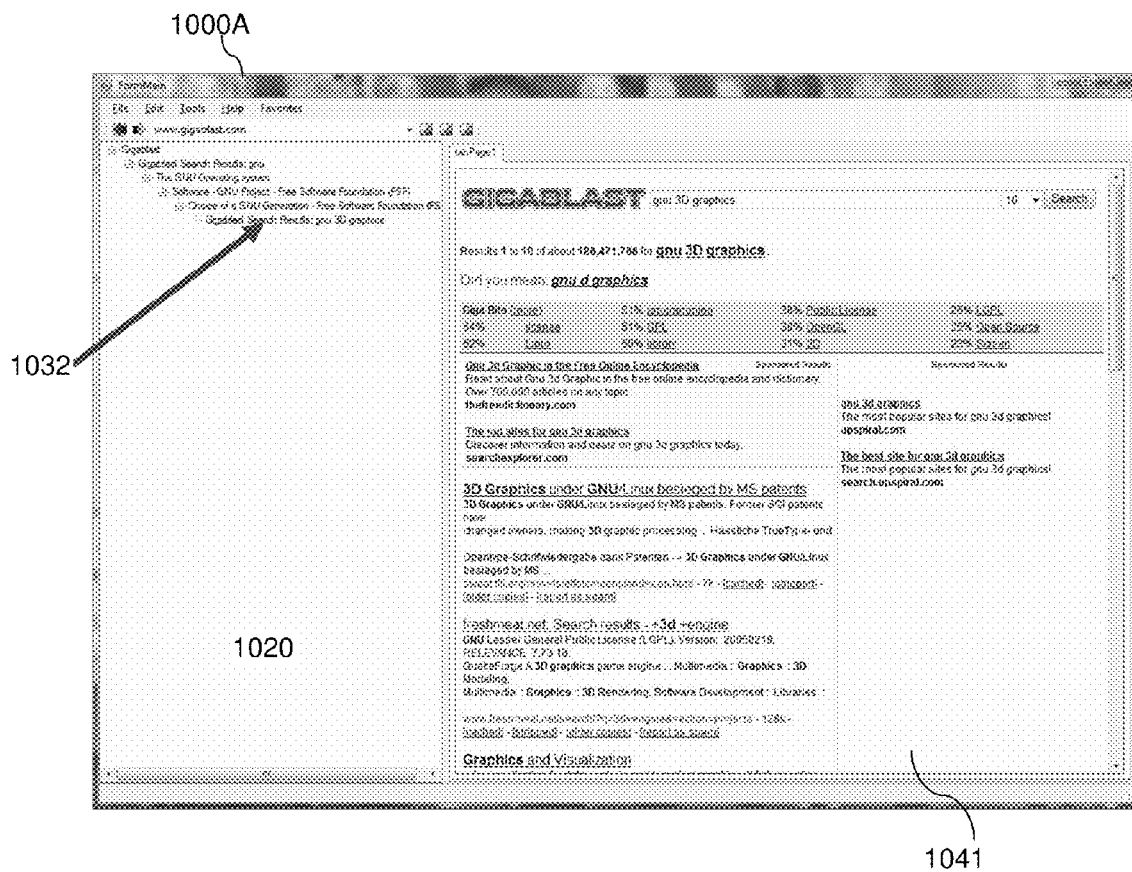
Figure 12H:
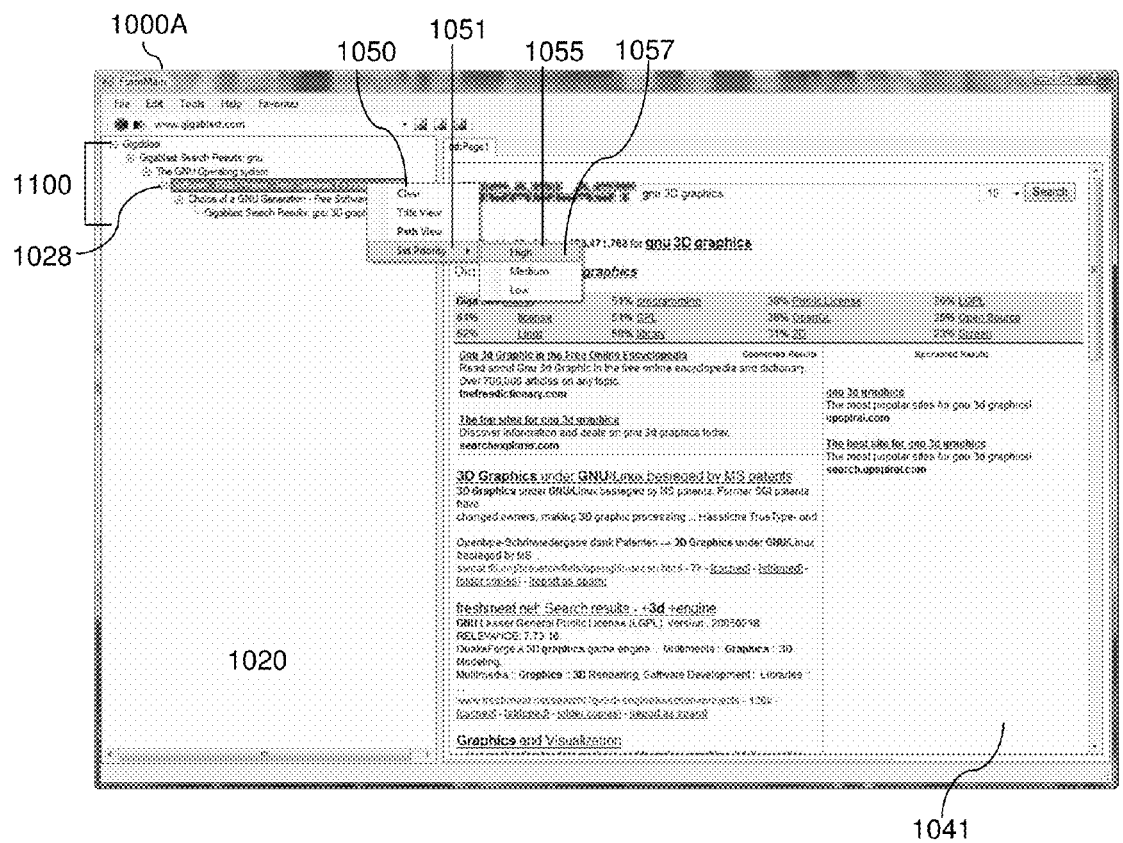

By utilizing hierarchical, tree text history entries created in the tree text history section and combining use of pop-up menus such as context menus 715, 800, 810, 820, 1030 property menus, dialog boxes 805, and management menu boxes 1050 (as shown in FIG. 12H), users can experience an enhanced web searching and browsing experience. For example, a user is conducting a search based on the search terms of "American Revolutionary War." After finding unsatisfactory and numerous search results, the user decides to continue the search by focusing and sub-searching for the search terms "James Madison" within the context of the search terms "American Revolutionary War." Therefore, the user focuses the initial search based on the search terms of "American Revolutionary War" to further include the additional sub-search terms such as "James Madison." Creation of tree text history entries in the tree text history section allows the user to know the initial search terms, sub-search terms and also to carry the context from which the sub-search is conducted. By carrying the context, the user can also easily visualize the context in which the search or sub-search was conducted. The context menus 800, 810, 820 as described in FIGS. 8A-8C and the dialog boxes 805 as described in FIGS. 9A-9C provide the user with the option to conduct sub-searches and continue to refine the initial search via context menus 800, 810, 820. The path from which the user initially started the search and the process of ending up with the final result is captured and recorded in the tree text history management methods and system.

Figure 8A:
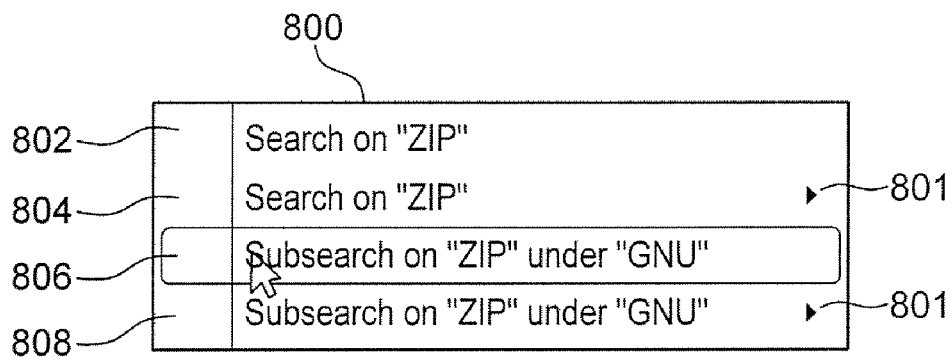
FIGS. 8A-8C are screen shots illustrating exemplary context menus and a method of conducting sub-searches in another exemplary embodiment.
Figure 8B:
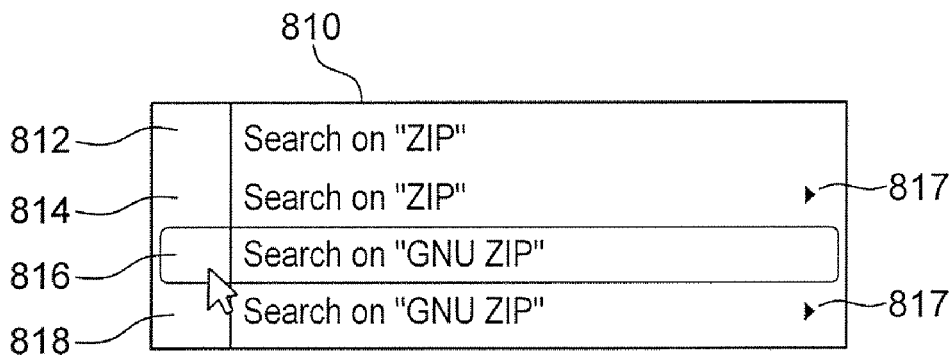
Figure 8C:
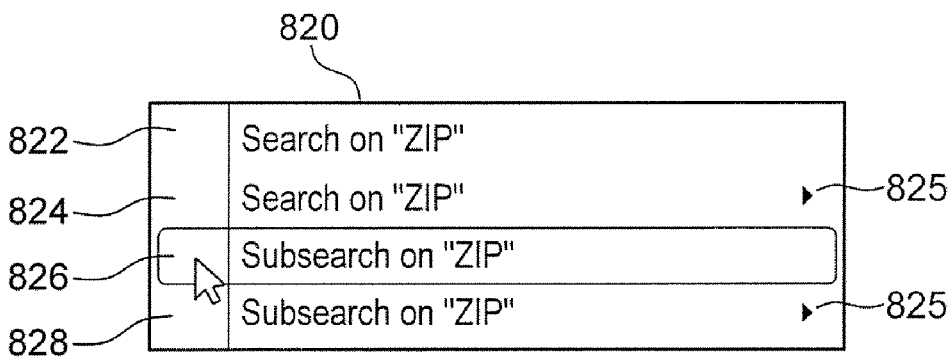
Figure 9A:
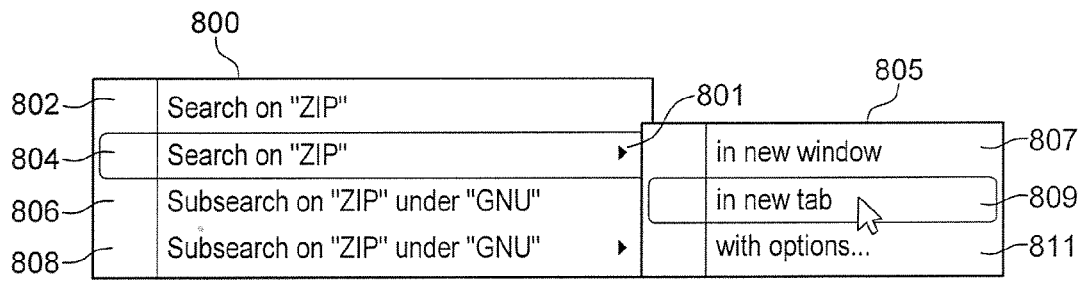
FIGS. 9A-9C are screen shots illustrating exemplary context menus and a method of conducting, retrieving, and displaying searches in other exemplary embodiments.
Figure 9B:
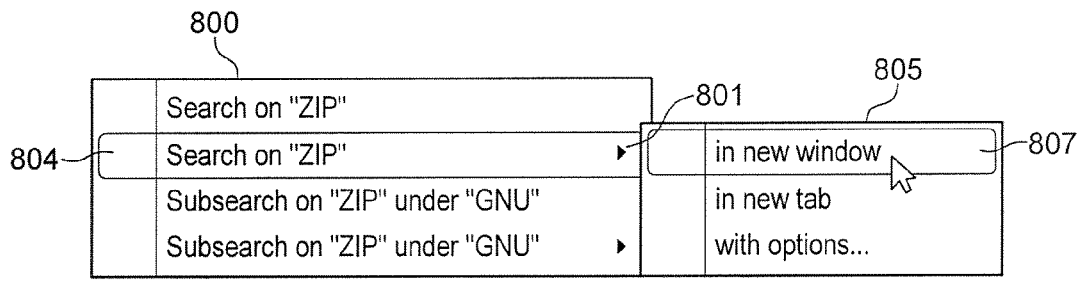
Figure 9C:
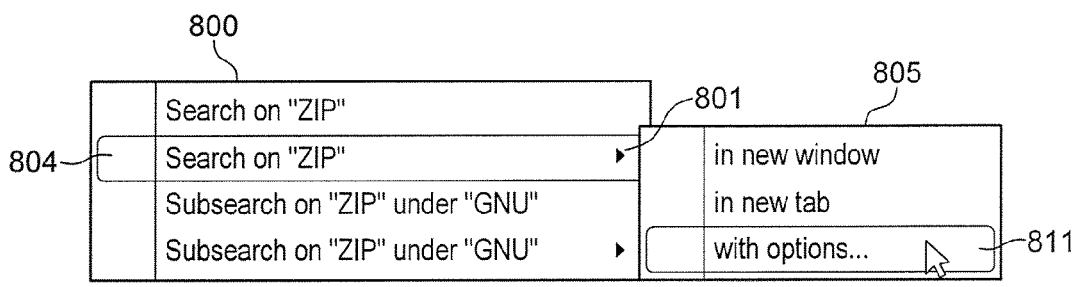

FIGS. 8A-8C are screen shots illustrating exemplary context menu 800, 810, 820 and a method of conducting sub-searches in another exemplary embodiment. For example, a user decides to perform sub-searches using additional terms after the user has performed a search under the search term of "GNU." Therefore, the user decides to further perform a sub-search by using both terms of "GNU" and "ZIP." In FIGS. 8A-8C, the exemplary context menu boxes 800, 810, 820 illustrate the searches and sub-searches to be conducted in various basic as well as advanced modes. In FIG. 8A of the exemplary embodiment, a search term "B" is used under a search term "A" for conducting a search. Depending on user options and/or configuration, the search terms are in quotes not only to delineate them but to also utilize the quotes to show the exact phrases or terms used for the searches and sub-searches. "A" is considered to be a first search term under which a search was conducted, such as "GNU." "B" is considered to be a second search term under which a search is further conducted such as "ZIP." Therefore, 'Search on "ZIP"' 802 is shown in the first line of the first context menu 800. In the second line of the first context menu, 'Search on "ZIP"' 804 includes an arrow 801 for further display selection in another pop-up, dialog box 805 that will be more readily understood in FIGS. 9A-9C and 10A-10C. In the third line of FIG. 8A, 'Subsearch on "ZIP" under "GNU"' 806 follows the rule of searching for "B" under "A." In the fourth line of the first context menu in FIG. 8A, 'Subsearch on "ZIP" under "GNU"' 808 is shown with an arrow displayed to the right for further display selection in a pop-up, dialog box 805 as more readily understood in FIGS. 9A-9C and 10A-10C. By right clicking on the arrow 801 of the fourth line 808 of the first context menu 800, a dialog box 805 pops up from which the user may select where and how to display the sub-search results.

FIG. 8B illustrates another exemplary embodiment of a context menu 810 wherein the search terms "A B" are used for conducting a search. Analogous to FIG. 8A, the search term "A" is considered to be "GNU" as an example, and the search term "B" is considered to be "ZIP." In FIG. 8B, the first line 812 of the second context menu 810 shows "Search on 'ZIP'" 812 for conducting a search under the search term of "ZIP." The second line 814 of the second exemplary context menu 810 shows 'Search on "ZIP"' 814 for conducting a search under the search term of "ZIP" that also provides a user for optionally selecting an arrow 817 to provide further options in a pop-up, dialog box 805 for where and how to display the sub-search results. The dialog box 805 will be more readily understood in FIGS. 9A-9C. In the third line with 'Search on "GNU ZIP"' 816 of the second context menu 810 in FIG. 8B, the search term follow the rule of conducting a sub-search by using the search terms "A B." In the fourth line 818 of the second context menu 810 in FIG. 8B, 'Search on "GNU ZIP"' is shown with an arrow 817 displayed on the right for allowing users to optionally select from a dialog box 805 for display instructions. Similar to FIG. 8A, the dialog box 805 displays ways in which the user may decide where and how to display the sub-search results in the Web document section.

FIG. 8C illustrates an exemplary embodiment of search terms in an advanced mode. In the third context menu 820 of FIG. 8C, the first line shows 'Search on "ZIP"' 822 for the first search conducted. Similarly, the second line shows 'Search on "ZIP"' for allowing users to right click on the arrow 825 for displaying a dialog box 805 for different ways in which the sub-search results may be displayed. In the third line 826 of the third context menu 820 in FIG. 8C, 'Subsearch on "ZIP"' 826 is shown. Only the second search term "ZIP" is displayed since the search terms are already saved in the tree text history entries to result in significantly shorter and smaller context menus. Therefore, a user may easily view the first search term of "GNU" in the first level tree text history entry, and only the second search term "ZIP" is shown for sub-search purposes in this exemplary embodiment of the third context menu 826. Any of the exemplary embodiments as shown in FIGS. 8A-8C may be implemented for the tree text history management system and methods, however, it should be appreciated that the context menu can be implemented to include other rules for displaying and conducting searches based on specific search terms. The context menu for sub-searches may be available to users as a viable and configurable feature of the tree text history system and methods even if no previous search has been conducted so that users may become aware of the context menu functionality. Alternatively, the context menu for sub-searches may be hidden until a search has been conducted. It should also be noted that the search and sub-search terms as demonstrated in these exemplary context menus can be modified, removed, and new search and/or sub-search terms may be added.

FIGS. 9A-9C are screen shots illustrating exemplary dialog boxes 805 and a method of conducting, retrieving, and displaying searches in exemplary embodiments. In FIG. 9A, the second line 804 of the first context menu 800 shows 'Search on "ZIP"' 804 with an arrow 801 located at the right side of the first context menu 800. By right clicking on the arrow 801 from the second line 804 of the first context menu 800, a dialog box 805 pops up with three display selections. As shown by the mouse point to the second line selection 809 from the dialog box 805, the second line selection allows a user to open up the search results based on the search term "ZIP" in a newly tabbed page within the browser. This second line selection of 'in a new tab' 809 opens up the search page with search results in a new tab without having to open a new window. Many mainstream browsers allow users to navigate among different Web sites and/or pages by selecting a tab from the many tabs located near the toolbar area of the browser for moving back and forth to view different Web pages or sites.

In FIG. 9B, the first line 807 of the dialog box 805 shows 'in a new window 807.' Upon selecting 'in a new window' of the first line 807 within the dialog box 805, the search results can be displayed in a new browser window. By selecting the 'in a new tab' option 809 or 'in a new window' option 807 from the dialog box 805, a new tree text history instance is created in the tree text history section 120, 620.

In FIG. 9C, the third line of 'with options' 811 is displayed in the dialog box 805. Users may select the third line of 'with options' 811 for adding, modifying, subtracting search terms in conducting searches. By selecting 'with options' 811 from the dialog box 805, users may also access the advanced features of most search engines. The advanced features include but are not limited to adding phrases, exclusionary terms, page preferences, date preferences, and language preferences. For example, a phrase used in the context menu 800, 810, 820 may be truncated since the phrase may be too long. Therefore, the phrase may be truncated by having a "word" with superscript asterisk shortly thereafter to demonstrate that the phrase used in the context menu 800, 810, 820 includes additional words that are not necessarily displayed completely in the context menu 800, 810, 820. Another example is to have a phrase in the context menu 800, 810, 820 in quotes, and an exclusionary term has a "minus sign" or "−" in front of the exclusionary term. For example, a context menu entry can be 'Subsearch on "Revolutionary War" under "Thomas Jefferson"-Montic*.' The term "Monticello" has been truncated to "Montic*." The advanced features are only exemplary and not limited to these specific examples, and other features may be integrated.

In order to save and store any content data from the searches and sub-search results, an additional pop-up dialog box is available under the "with options" selection from the dialog box. The additional pop-up dialog box allows users to save Web page images either when entering the Web page or when leaving the Web page. The additional pop-up dialog box also allows users to save the Web page data in either the complete Web Page or in an HTML format only. The corresponding Web page images and Web page data are saved in connection with the tree text history entries so that the saved Web page images and data are easily searchable for users. Further, if users select a configuration option to automatically save any Web page data as Web pages are navigated, additional Web page data can be saved either when entering the Web page or leaving the Web page.

Figure 10A:
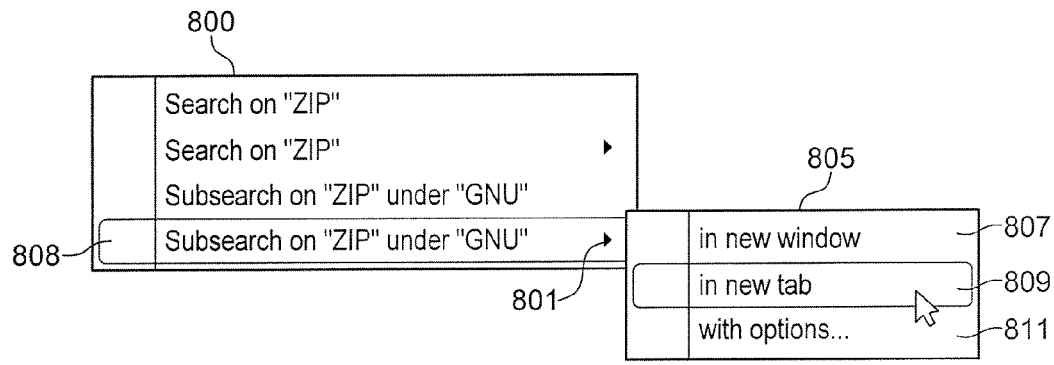
FIGS. 10A-10C are screen shots illustrating exemplary context menus and a method of conducting, retrieving, and displaying sub-searches in exemplary embodiments.
Figure 10B:
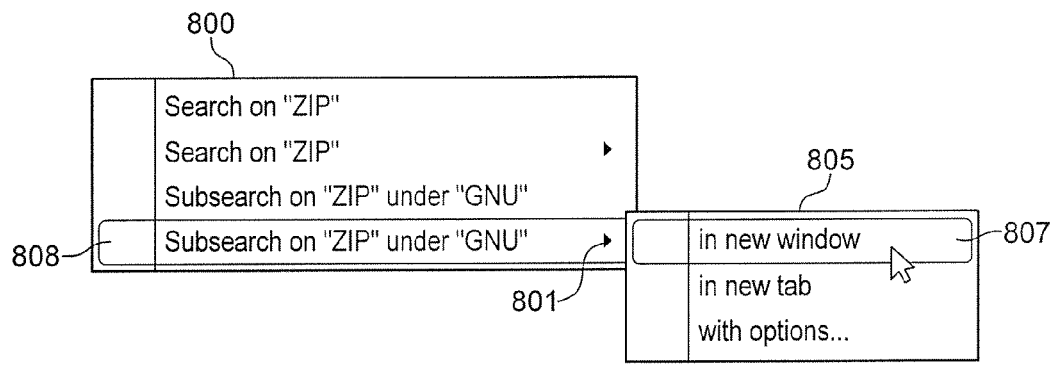
Figure 10C:
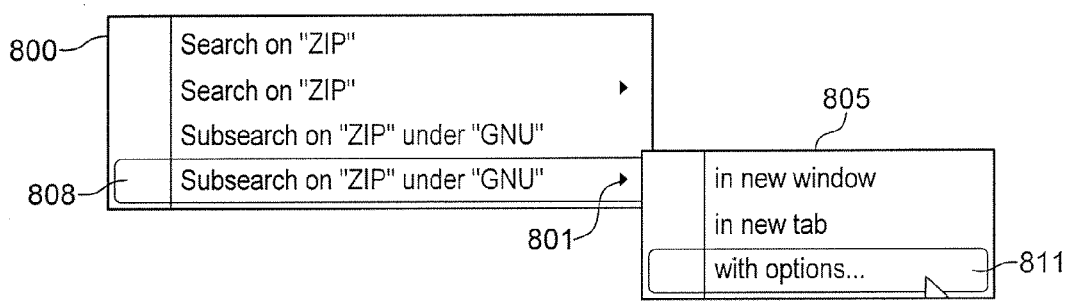

Similarly, FIGS. 10A-10C are screen shots illustrating exemplary dialog boxes 805 and a method of conducting, retrieving, and displaying sub-searches in exemplary embodiments. As shown in FIGS. 9A-9C, FIGS. 10A-10C illustrate the dialog boxes 805 which are accessible from the context menus 800, 810, 820. In FIG. 10A, the fourth line 808 of the first context menu 800 is highlighted, and the arrow 801 on the right side is selected by clicking on the arrow 801 for the dialog box 805 to pop-up. As the mouse point is on the second, highlighted line of 'in a new tab 809,' the sub-search results based on the search terms of "ZIP" under "GNU" may be displayed in a newly tabbed page within the same browser. In FIG. 10B, the first line 807 selection from the dialog box 805 shows the mouse point to the 'in new window 807.' By selecting the 'in new window' option 807 from the dialog box 805, the sub-search results based on the search terms of "ZIP" and "GNU" may be displayed in a new browser window. In FIG. 10C, the third line 811 selection from the dialog box shows the mouse point to the 'with options' 811 selection. Selection of the third 'with options' line 811 allows users to access yet another pop-up box for modifying the terms of the sub-searches to be conducted as previously described.

Although not shown in these FIGS. 9A-C and FIGS. 10A-C, an additional feature allows users to easily remove search or sub-search terms from the context menus. This functionality of removing search or sub-search terms is configured either from the 'with options' 811 selection from the context menu 800, 810, 820 or alternatively, in a completely separate, second context menu. The feature of removing search or sub-search terms may be enabled or disabled and configurable by users. Enabling the removal functionality provides users with a context menu 800, 810, 820 or from the "with options" 811 selection of the context menu 800, 810, 820 to remove and/or modify the search and/or sub-search terms. For ease of use and brevity, the feature may be disabled or hidden until it is necessary.

Figure 11:
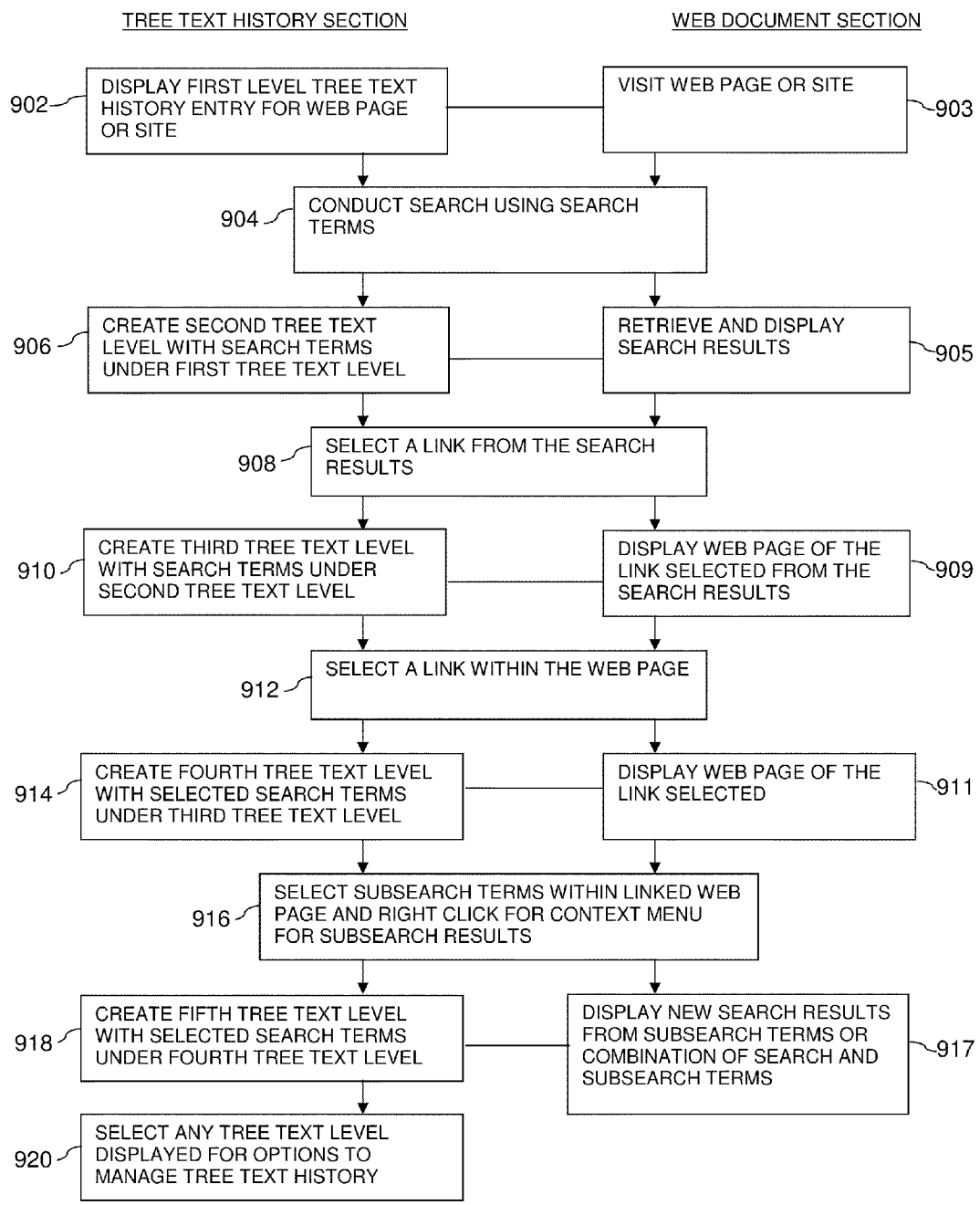
FIG. 11 is a flow chart illustrating a system and methods for conducting searches from the Web document section, simultaneously receiving and creating the tree text history entries in the tree text history section in an exemplary embodiment.

FIG. 11 is a flow chart illustrating a system and methods for conducting searches from the Web document section 110, simultaneously receiving and creating the tree text history entries in the tree text history section 120, 620 in an exemplary embodiment. In step 903, a user first visits a Web page on the Internet by typing in its URL. As the Web document section 110 displays any arbitrary Web page or Web site visited by the user, the first level tree text history entry with the title or URL for the Web page visited is created in the tree text history section 120, 620 as shown in step 902. The tree text history entries may include either the title of the Web site or its URL in the case where the title is not available. In step 904, the user enters a search term or terms into a search box 108 of the browser 100 or a search box 114 of the search engine Web page. Optionally, the user may type in the URL of the first web page directly into the URL box of the browser after which the Web page of the URL is displayed in the Web document section 110. In step 905, the search results are retrieved and displayed in the Web document section 110 of the browser 100 upon receiving the search terms. Simultaneously, in step 906, the tree text history section 120, 620 receives the title and URL of the Web page/site visited and creates a second level of tree text history entry within the tree text history section 120, 620 with the title (or URL) and search terms underneath the first level of the tree text history entry. In step 908, the user then decides to select a link from the search results page.

With continuing reference to FIG. 11, a Web page or site of the link previously selected by the user is displayed within the Web document section 110 after clicking on the link of interest as shown in step 909. Simultaneously, in step 910, a third level of tree text history entry is created underneath the second level of tree text history entry with either the title or URL of the newly linked page and the search terms within the tree text history section 120, 620. In step 912, the user may select any link of interest within the Web page, and in step 911, the Web document section 110 displays the Web page of the link selected. Simultaneously, in step 914, a fourth level of tree text history entry is created underneath the third level of the tree text history entry with either the title or URL of the newly linked page and the search terms within the tree text history section 120, 620. In step 916, the user may decide to conduct further sub-searches by selecting links or using sub-search terms from the previous linked Web page and further right-clicking for pulling up a context menu from which a further sub-search can be selected. Therefore, in step 916, the sub-search and/or search results are displayed in the Web document section 110 upon selecting the search and sub-search terms from the context menu. Simultaneously, in step 918, a fifth level of tree text history entry is created below the fourth level the tree text history entry with either the title or URL and the sub-search terms. After the tree text history is created in a hierarchical format in the tree text history section, user may select any of the five levels of tree text history entries for modifying, sorting, deleting, saving, pruning, storing, exporting, and/or managing the tree text history entries for future use as shown in step 920. This FIG. 11 of methods is not meant to be limiting in any way and any number of tree text history entries may be created at various levels within the set of the Web pages visited from any combination of searches.

It will be understood that each block and combinations of blocks in these flow charts may be implemented by computer program instructions. These computer program instructions may be loaded onto a computer (or the memory of the computer) to produce a machine, such that the instructions that are executed on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of structures and combinations of steps for performing the specified functions. It will also be understood that each block and combinations of blocks in the flow charts, may be divided and/or joined with other blocks of the flow charts without affecting the scope of the invention.

FIGS. 12A through 12H are screen shots illustrating an exemplary embodiment of implementing the steps of and consistent with the principles of the invention. In FIG. 12A, a user visits an exemplary Web page of the Giga Blast search engine 1021. In the left hand, tree text history section 1020 below the history bar 1016, the title of "Gigablast" is created as the first level of the tree text history entry 1022 with the Gigablast logo on the left at the same time the Giga Blast page 1021 is displayed in the right hand Web document section. As shown in the Gigablast web browser 1000, the URL box 1004 displays "http://www.gigablast.com/." In FIG. 12B, the user enters the search term "GNU" in the search box 1014 from the search engine and hits the enter button either from the input device or hits the 'Search' button 1015 from the Web page 1023. While the search results based on the search term of "GNU" are displayed in the Web document section as the GNU Search Results Web page 1023, the second level of tree text history entry of "Gigablast-GNU" 1024 is created in the tree text history section 1020 as shown in highlighted portion in FIG. 12B. The user then decides to select the first search result link of "The GNU Operation system-the GNU project-Free Software Foundation" 1017 as displayed from the Web page as shown in FIG. 12B. Upon selecting the first search result or link 1017, the user is directed to the link for "The GNU Operating System" 1025 as shown in the Web document section of FIG. 12C. Simultaneously, the third level of the tree text history entry 1026 is created within the tree text history section 1020 as "The GNU Operating System" 1026 and underneath the second level of the tree text history entry. This third level of the tree text history entry 1026 is highlighted in the tree text history section 1020 in FIG. 12C.

From the Web page 1025 displayed in FIG. 12C, the user decides to select the underlined link of "GNU software packages" 1021 from the "The GNU Operating System-Free as in Freedom" Web page 1025. It should be noted that any entries or links may be selected from or any search/sub-search terms entered within any Web pages when conducting searches or sub-searches. With continuing reference to FIG. 12C, the user selects the link of "GNU software packages" 1021 from the Web page 1025 that directs the user to the "GNU Operating System" Web page 1027 displayed in FIG. 12D. Simultaneously, the fourth level of the tree text history entry 1028 is created in the tree text history section 1020 as "Software-GNU Project-Free Software Foundation (FSF) 1028." From the "GNU Operating System" Web page 1027 as displayed in FIG. 12D, the user decides to further continue the search by clicking on the "list of GNU/Linux distributions which are entirely free software link 1029." Upon clicking on this link 1029, the user is directed to the new Web page 1031 as displayed in the Web document section of FIG. 12E. Simultaneously, a fifth level of the tree text history entry of "Choice of a GNU Generation-Free Software Foundation (FSF)" 1030 is created within the tree text history section 1030 as the fifth level of the tree text history entry 1030 underneath the fourth level tree text history entry 1028. The user then continues to conduct a sub-search by highlighting the text of "3D Graphics" 1033 from the Web page 1035 as displayed in FIG. 12F. By selecting to perform a sub-search, the user right-clicks for the context menu 1030 to appear as shown in FIG. 12F. Upon selecting and right clicking on the sub-search terms of "3D Graphics" as shown in the highlighted portion 1033 from the Web page 1035 by scrolling down, the context menu 1037 pops up providing the user with the option to conduct a sub-search by combining the sub-search terms "3D Graphics" with the original search term "GNU" as shown in the highlighted portion in the fourth line 1037.

As shown in FIGS. 12A through 12C, an icon of the search engine 1005 in which the search was conducted may be displayed. In FIGS. 12A through 12C, the icon 1005 displayed is for Gigablast since the exemplary screenshot used the Gigablast search engine, however, the icon may be for any other search engine that was used to conduct the search. In this way, the user can immediately visualize the search engine used to conduct a search or sub-search.

In FIGS. 12D through 12H, every level of the tree text history entry with sub-level tree text history created beneath is collapsible and expandable as standard behavior of tree histories to truncate or expand the tree text history entries. Any set of tree text history entries in the tree text history section 120, 620, 1020 is also collapsible and expandable for collapsing and/or expanding tree text history entries. Therefore, a "minus sign" or "−" in the box located left to a tree text history entry displays all the tree text history entries while a "plus sign" or "+" in the box located left to a tree text history entry hides the sub-level tree text history entries by collapsing the tree text history entries created beneath. By simply clicking on the "plus sign" or "minus sign" to the left of the tree text history entry, the sub-level tree text history entries are easily expanded or collapsed.

As described in FIGS. 8A-8C and the context menu 800, 810, 820, 1030 as shown in FIG. 12F provides the search and sub-search functionality based on the search and sub-search terms used by the user. The user selects the third line such as 'Search on "3D Graphics" with "GNU"' 1037 from the context menu 1030, in order to conduct a sub-search including the search terms of "GNU" and "3D Graphics." After selecting the third line of 'Search on "3D Graphics" and "GNU"' 1037 from the context menu 1030, the Web document section displays and directs the user with a new sub-search Web page of "GNU 3D Graphics" 1041 as shown in FIG. 12G. Simultaneously, the sixth level of the tree text history entry 1032, such as "Gigablast Search Results-GNU 3D Graphics" is created within the tree text history section 1020. At this point, the user may decide to return to the fourth level of the tree text history entry, such as "Software-GNU Project-Free Software Foundation (FSF)" 1028 from the tree text history entries created. As the highlighted portion of "Software-GNU Project-Free Software Foundation (FSF)" 1028 from the tree text history section 1020 shows, the user returns and selects this specific, fourth level tree text history entry 1028. By selecting and right clicking on this "Software-GNU Project-Free Software Foundation (FSF)" tree text history entry 1028, the methods and system of the present invention provides the user with a pop-up, management menu box 1050 with various options.

The exemplary management menu box provides the user to 'Clear' the page such as removing or deleting any selected tree text history entry from the tree text history. By selecting the "Title View" option from the management menu box, either the HTML title of the Web page or user-set title of the Web page is displayed in the tree text history section 120, 620, 1020. By selecting the "Path View" option from the management menu box 1050, the URL of the Web page is displayed in the tree text history section 120, 620, 1020. In this exemplary embodiment, the user selects the "Set Priority" option 1051 from the management menu box 1050 upon which the priority box 1055 pops up. By selecting the "Set Priority" option 1051, the user can set the specific tree text history entry by setting priority at different levels. The priority settings available for users are "High," "Medium," and "Low." In this exemplary embodiment, the user has selected "High" option 1057 to set the "Software GNU Project-Free Software Foundation (FSF)" with high priority to make note of the tree text history entry. By noting and recording a priority setting, users are likely to focus on the tree text history entries that are of high priority. Another example of the management menu box 1050 option includes displaying "Web Page Properties" (not shown in FIG.) that shows all the miscellaneous data such as the lastly accessed, first accessed, URL, title and other useful information in a separate dialog box, page, or window. While the exemplary management menu box 1050 provides these functions, the management menu box 1050 is not limited to only these functions and are meant to be exemplary. The set of plurality of tree text history entries 110 for this search for "GNU" and "3D Graphics" is displayed in the tree text history section 1020.

Figure 13A:
FIGS. 13A through 13U are screen shots illustrating an exemplary embodiment of implementing the steps of and consistent with the principles of the invention.
Figure 13B:
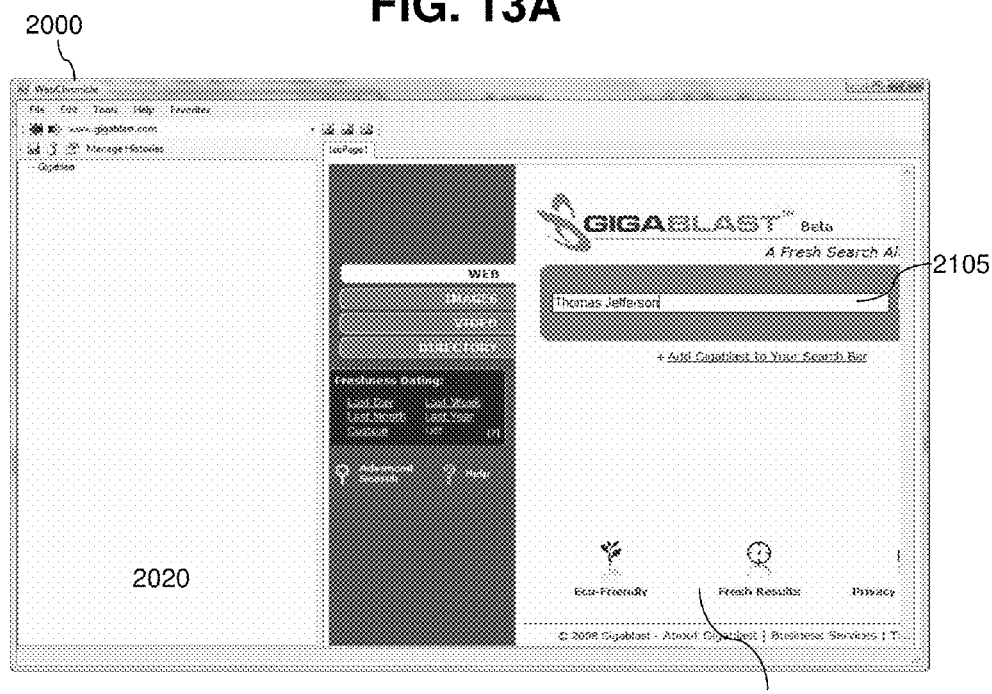
Figure 13C:
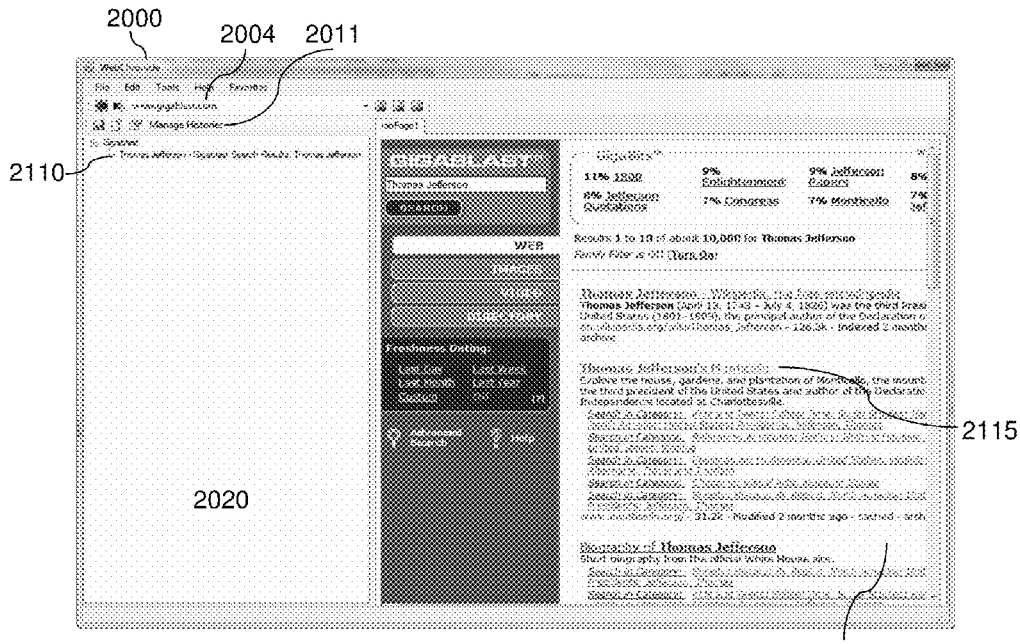
Figure 13D:
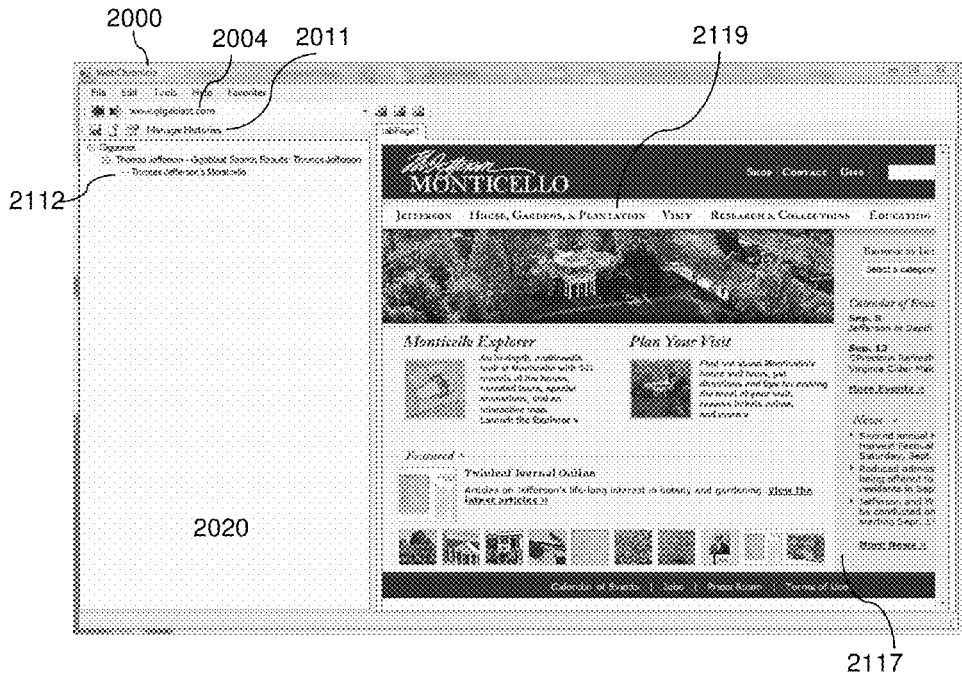
Figure 13E:
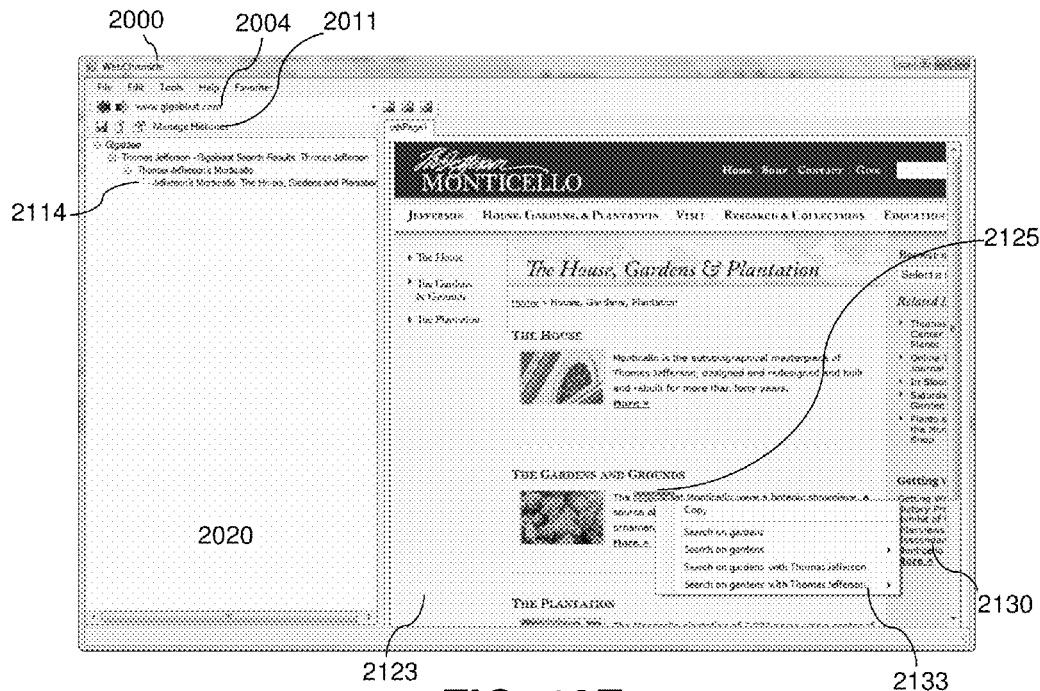
Figure 13F:
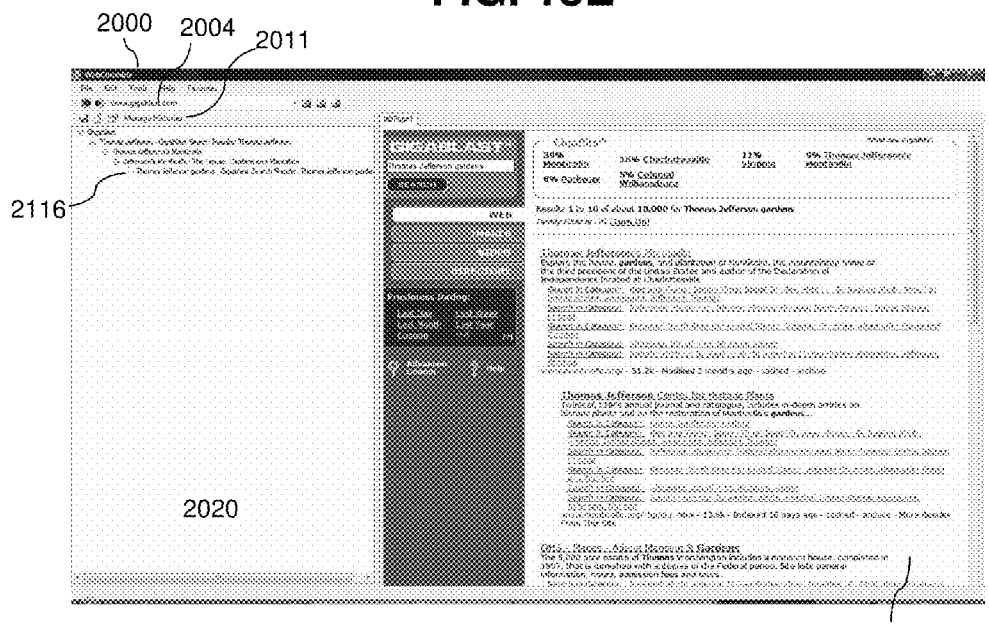
Figure 13G:
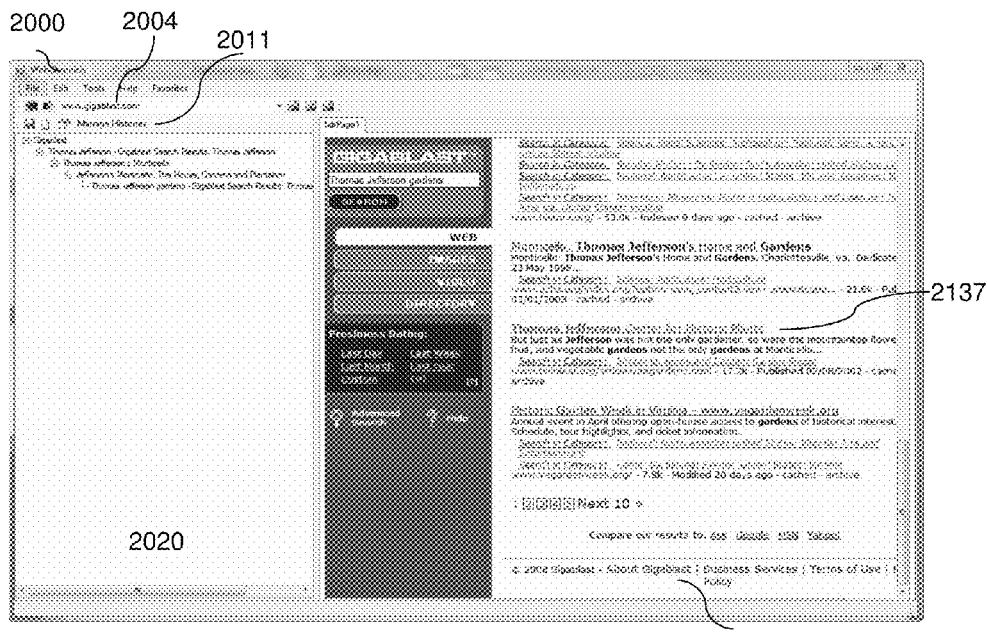
Figure 13H:
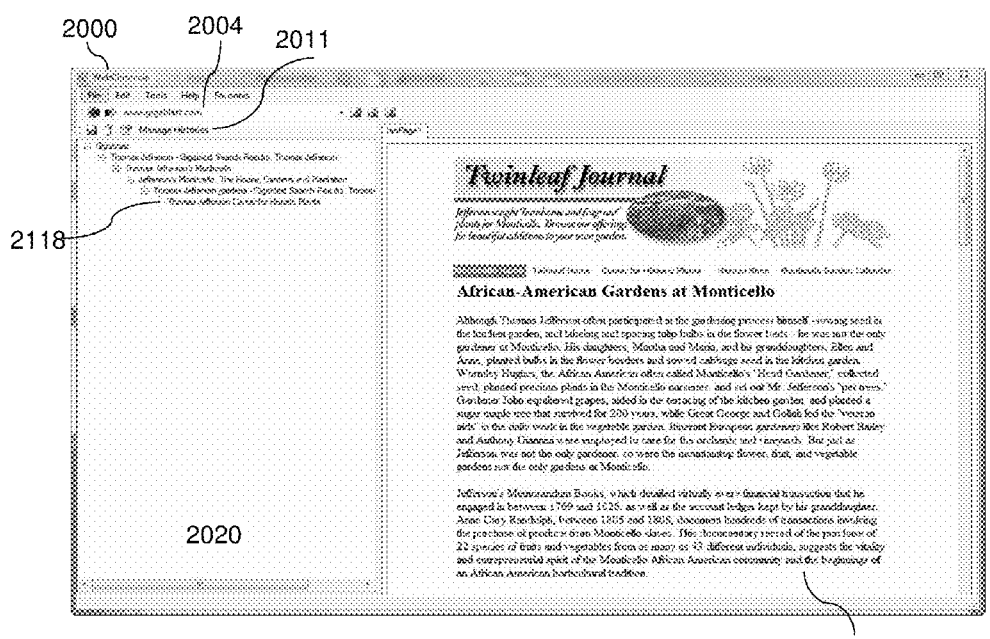
Figure 13I:
Figure 13J:
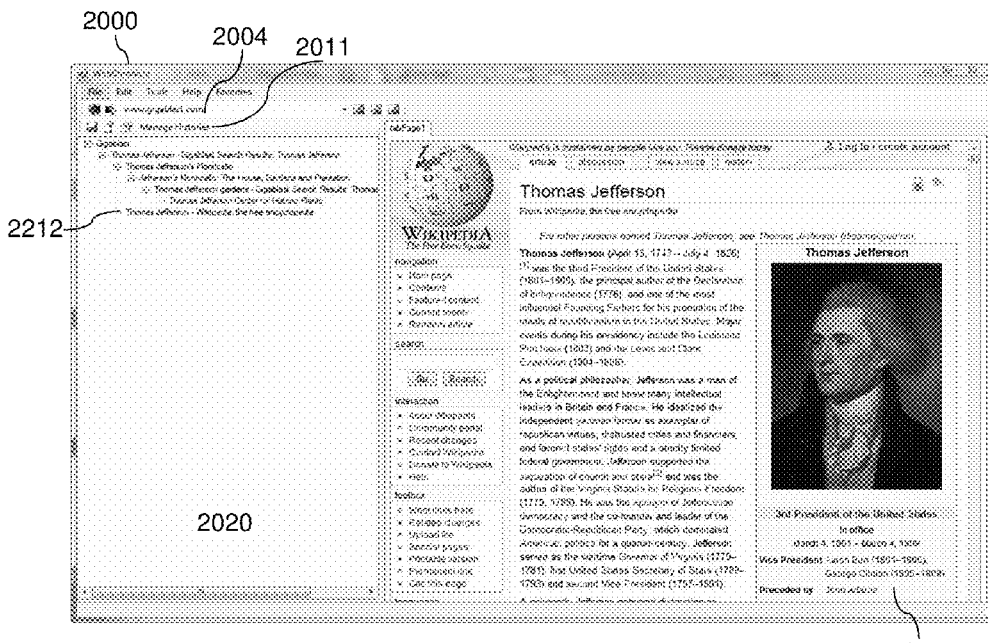
Figure 13K:
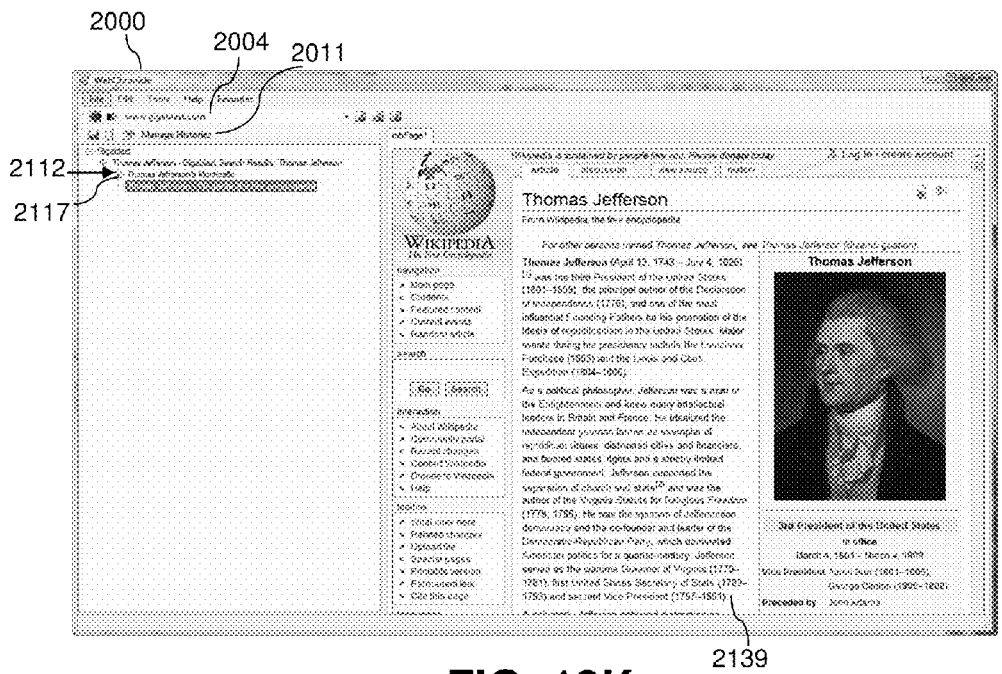
Figure 13L:
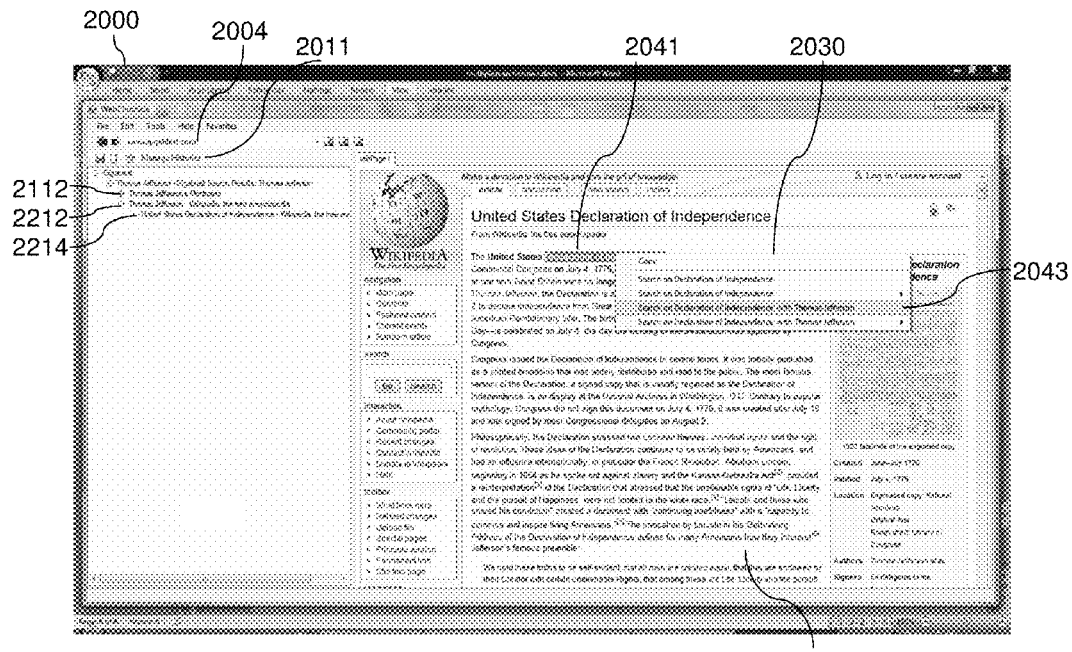
Figure 13M:
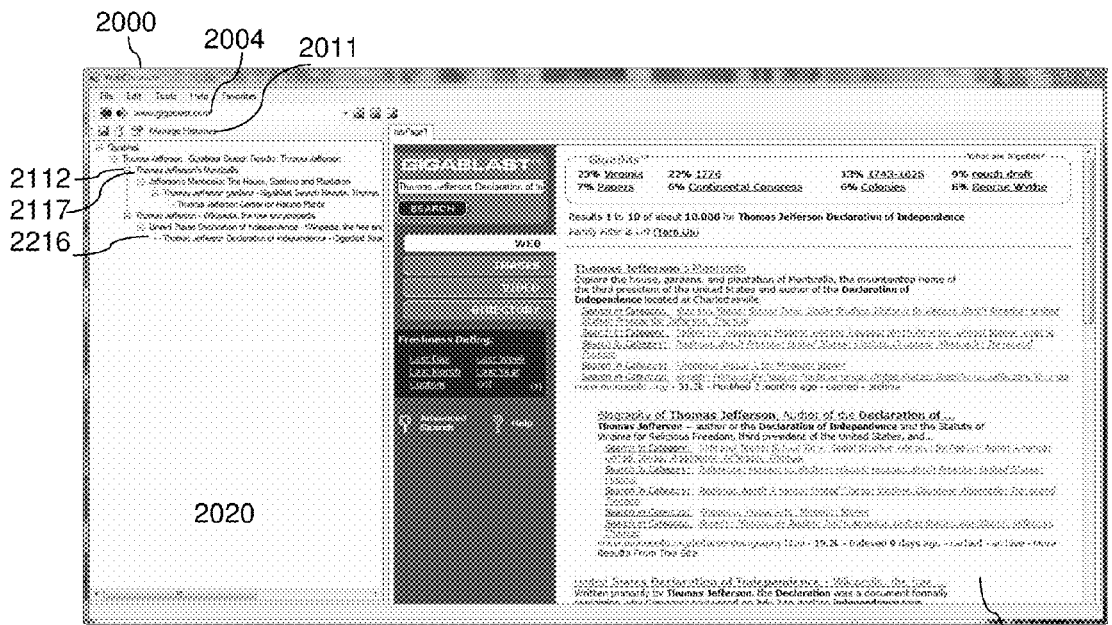
Figure 13N:
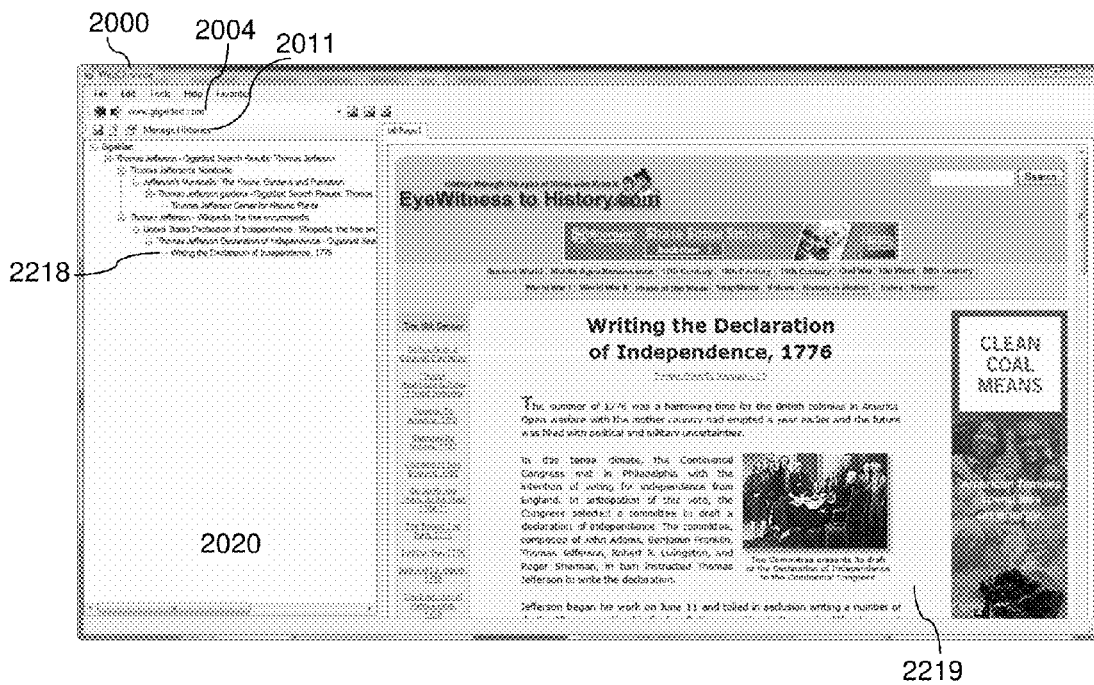
Figure 13O:
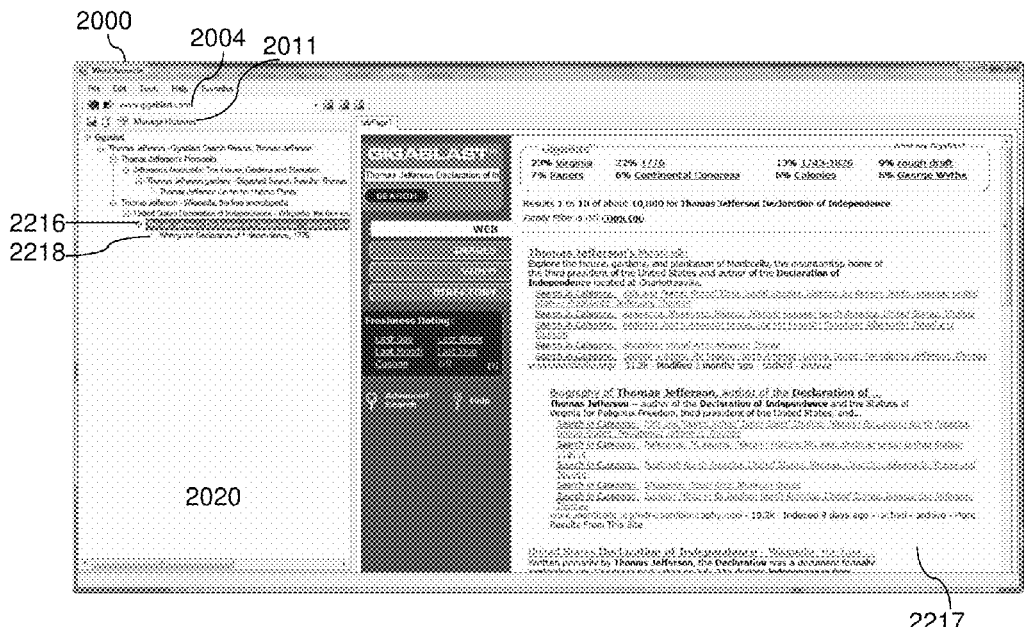
Figure 13P:
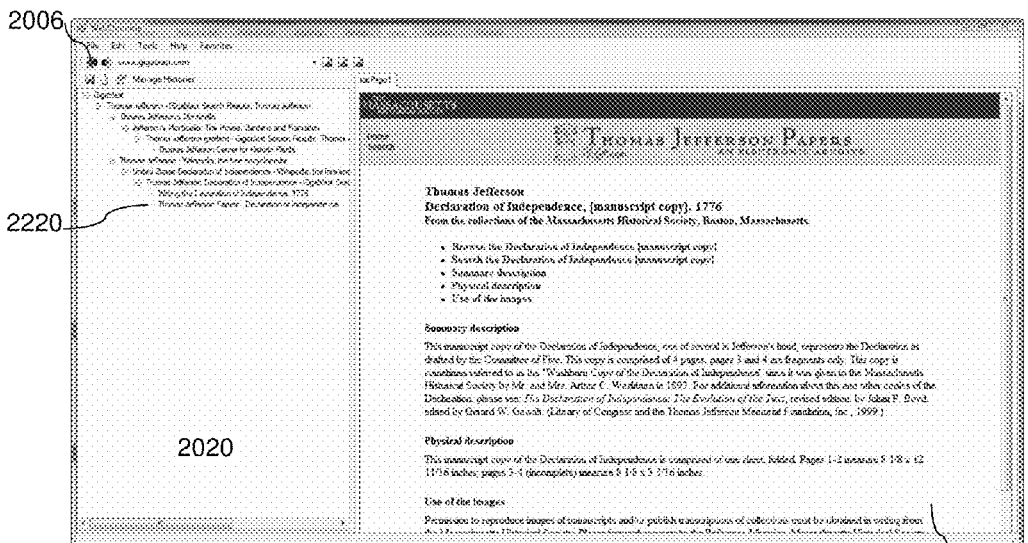
Figure 13Q:
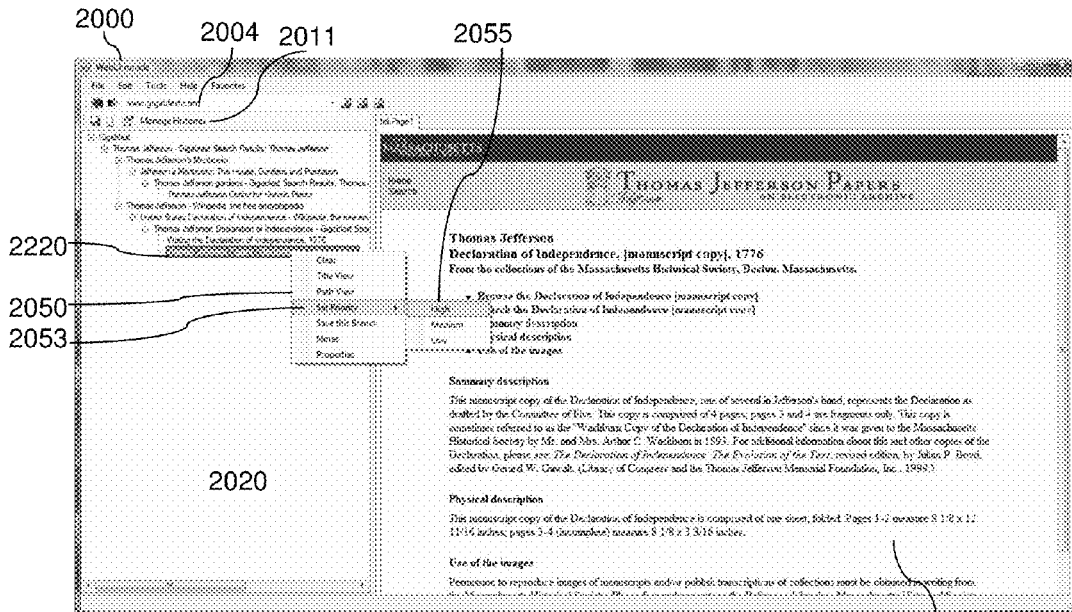
Figure 13R:
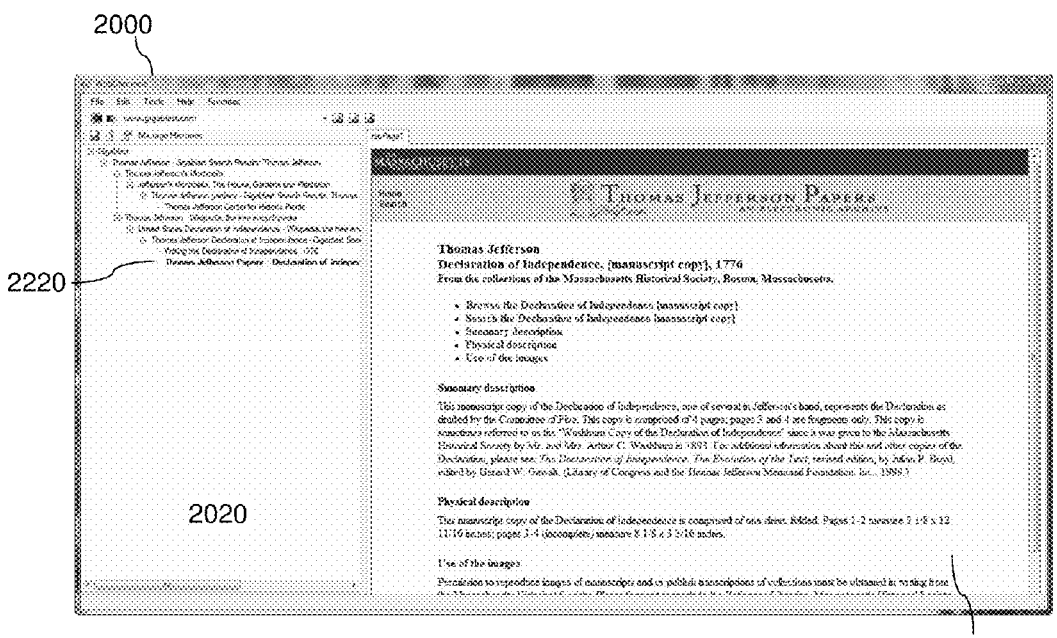
Figure 13S:
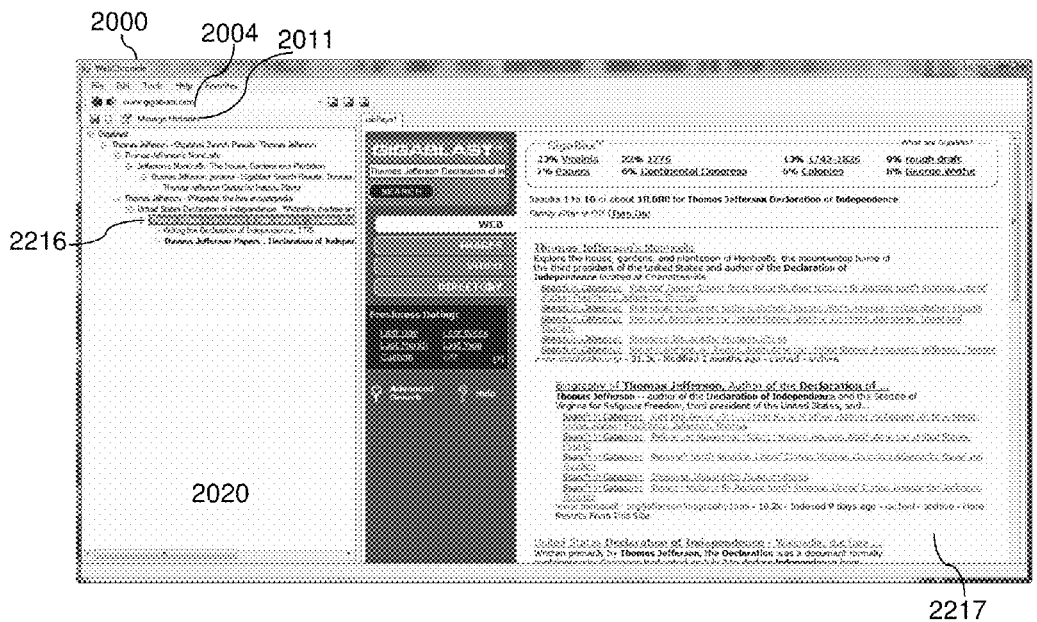
Figure 13T:
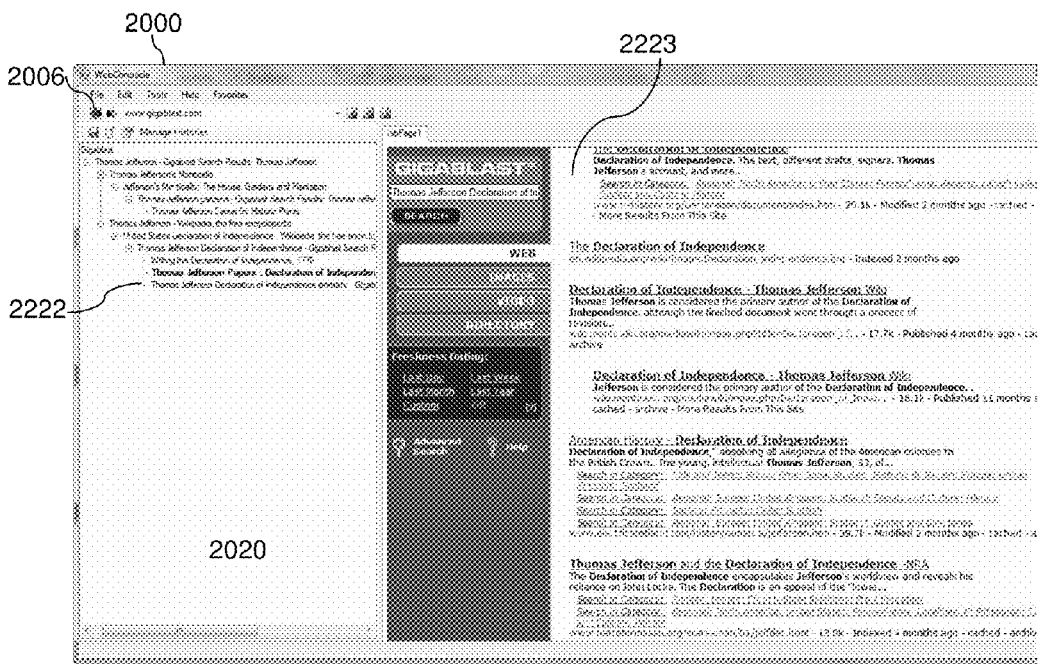
Figure 13U:
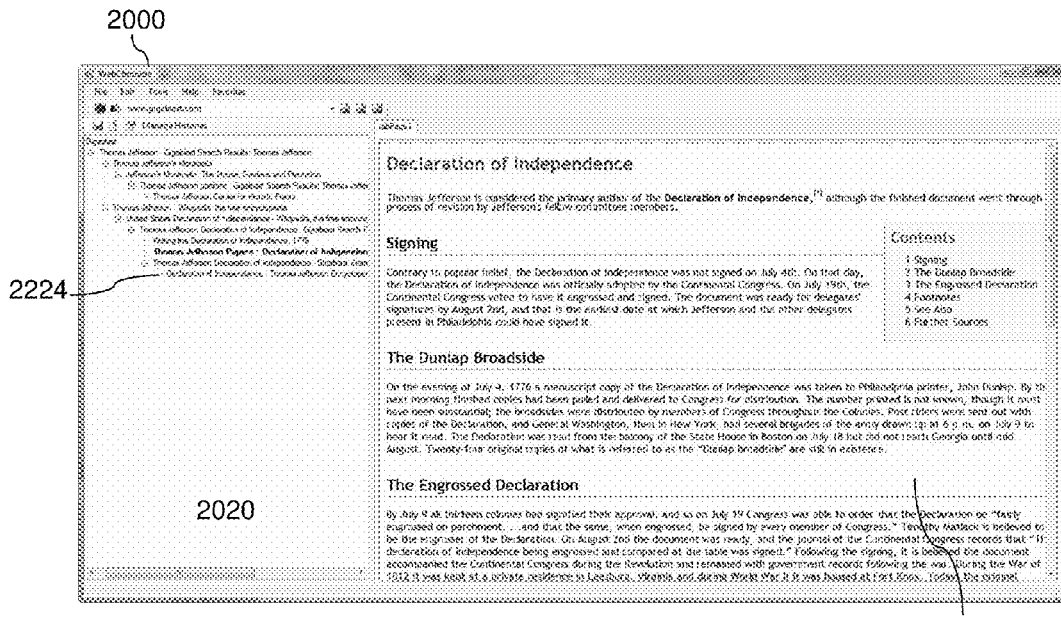

FIGS. 13A through 13U are screen shots illustrating an exemplary embodiment of implementing the steps of the invention and consistent with the principles of the present invention in a WebChronicle™ browser. In FIG. 13A, a user visits an exemplary Web page of the Giga Blast search engine 2103. In the left hand, tree text history section 2020 below the Manage Histories bar 2011, the title of "Gigablast" is created as the first level of the tree text history entry 2100 at the same time the Giga Blast page 2103 is displayed in the right hand Web document section. In FIG. 13B, the user inputs the search terms "Thomas Jefferson" in the search box 2105 from the Gigablast search engine. In FIG. 13C, the user submits the search terms by either pressing the enter button or clicks on the search button from the search engine page at which time the second level of tree text history entry 2110 is simultaneously created in the left hand tree text history section 2020. The "Thomas Jefferson" Web page 2111 is displayed on the right hand Web document section. It is noted that the second level of the tree text history entry 2110 is subordinate to or at a sub-level immediately below the first level of the tree text history entry of "Gigablast." The context in which the search is conducted is currently set at "Thomas Jefferson." In FIG. 13D, the user inputs a second search term or clicks on a search result link for "Thomas Jefferson's Monticello" 2115 and the new Web page for "Jefferson Monticello" 2117 is displayed in the Web document section while the tree text history entry of "Thomas Jefferson's Monticello" 2112 is created simultaneously in the left hand tree text history section 2020 that is again subordinate to or at a sub-level immediately below the second level of the tree text history entry of "Thomas Jefferson-Gigablast Search Results: Thomas Jefferson" 2110.

The user clicks on the link of "House, Gardens & Plantation" 2119 from the Web page 2117 as shown in FIG. 13D and the new Web page of "House, Gardens & Plantation" 2123 is displayed in the Web document section as shown in FIG. 13E. In the left hand tree text history section 2020 of FIG. 13E, a tree text history entry of "Jefferson's Monticello: The House, Gardens and Plantation" 2114 is simultaneously created subordinate to or at a sub-level immediately below the third level of the tree text history entry of "Thomas Jefferson's Monticello" 2112. In FIG. 13E, the user highlights or selects the term "garden" 2125 from the displayed Web page 2123 and right clicks for the context menu 2130 to pop up. The context menu box is shown with the options of "Search on gardens," "Search on gardens" with further options, "Search on gardens with Thomas Jefferson", or "Search on gardens with Thomas Jefferson" with further options. The user then selects "Search on gardens with Thomas Jefferson" 2133 from the four choices as shown in the context menu 2130.

Upon selecting the choice of "Search on gardens with Thomas Jefferson," a new Web page 2135 is displayed in the Web document section from the search terms of "Thomas Jefferson" and "gardens" as shown in FIG. 13F. The new context for future searches is now "Thomas Jefferson garden." Simultaneously, a tree text history entry of "Thomas Jefferson gardens-Gigablast Search Results: Thomas Jefferson gardens" 2116 is created subordinate to or at a sub-level immediately beneath the fourth level of the tree text history entry of "Jefferson's Monticello: The House, Gardens and Plantation" 2114. In FIG. 13G, the user scrolls down from the Web page 2135 displayed from FIG. 13F, and finds a link that the user finds useful and thereby selects the "Thomas Jefferson Center for Historic Plants" link 2137. Upon selecting the link 2137, a new Web page of "Twinleaf Journal" 2137 is displayed in the Web document section as shown in FIG. 13H, and simultaneously, the tree text history entry of "Thomas Jefferson Center for Historic Plants" 2118 is created subordinate to or at a sub-level immediately below the fifth level of the tree text history entry of "Thomas Jefferson gardens-Gigablast Search Results: Thomas Jefferson gardens" 2116.

In this exemplary embodiment, the user decides at this point to start researching the terms for "Declaration of Independence." The user clicks on the original search results or the second level of the tree text history entry of "Thomas Jefferson-Gigablast Search Results-Thomas Jefferson" 2110 as shown in highlight in the tree text history section 2020 and the corresponding Web page of "Gigablast Search Results" is displayed in FIG. 13I. Therefore, the context is back to "Thomas Jefferson" at which time a second search is conducted. The user decides to select the first search result or the link of Wikipedia 2113 from the displayed Web page 2111 corresponding to the second level of the tree text history entry 2110 of "Thomas Jefferson-Gigablast Search Results-Thomas Jefferson." Upon selecting the link of Wikipedia search results 2113, a new Web page 2139 is displayed in the Web document section and a new tree text history entry of "Thomas Jefferson-Wikipedia the free encyclopedia" 2212 is created in the left hand tree text history section 2020 that is subordinate to the second level of the tree text history entry of "Thomas Jefferson's Monticello" and created at the third level of the tree text history entry 2212.

As shown in FIG. 13J, the tree text history entry of "Thomas Jefferson-Wikipedia the free encyclopedia" 2212 is created at the third level because the context is still "Thomas Jefferson" without any additional search terms. In FIG. 13K, the user clicks on the "minus sign" or "−" in a box 2117 on the left side of the tree text history entry of "Thomas Jefferson's Monticello" to collapse all the subordinate levels of the tree text history entries. This view simplifies the tree text history section view hiding all the subordinate levels of the tree text history entries of "Thomas Jefferson's Monticello" entry.

Upon clicking on a link from the previous Web page 2139 as displayed in FIG. 13K, the new Web page of United States Declaration of Independence 2141 is displayed in FIG. 13L while the tree text history entry of "United States Declaration of Independence-Wikipedia, the free encyclopedia" 2214 is created subordinate to and at a sub-level immediately beneath the third level tree text history entry of "Thomas Jefferson-Wikipedia, the free encyclopedia" 2212. In FIG. 13L, the user highlights and selects the phrase "Declaration of Independence" 2041 from the displayed Web page 2141 and right clicks to obtain the context menu box 2030. As shown in FIG. 13L, the context menu box 2030 displays four options of "Search on Declaration of Independence," "Search on Declaration of Independence" with further options, "Search on Declaration of Independence with Thomas Jefferson," or "Search on Declaration of Independence with Thomas Jefferson" with further options. As shown in the highlighted portion in the context menu 2030, the user selects the choice of "Search on Declaration of Independence with Thomas Jefferson" 2043, at which time, the new Web page with search results of "Declaration of Independence and Thomas Jefferson" 2217 is displayed in FIG. 13M while the tree text history entry of "Thomas Jefferson Declaration of Independence-Gigablast Search" 2216 is created subordinate to and at a sub-level immediately below the lastly created fourth level of the tree text history entry of "United States Declaration of Independence-Wikipedia, the free encyclopedia" 2214. The context is currently at "Thomas Jefferson Declaration of Independence." In FIG. 13M, the user decides to expand the tree text history view by clicking on the "plus sign" or "+" box 2117 located at the left side of the tree text history entry of "Thomas Jefferson's Monticello," and the expanded view of the subordinate levels of tree text history entries are shown under the third level "Thomas Jefferson's Monticello" tree text history entry 2112 in the tree text history section 2020.

By clicking on the link of "Writing the Declaration of Independence 1776" (not shown in FIG. 13M) from the search results of the Web page 2217 as displayed in FIG. 13M, the new Web page of "Writing the Declaration of Independence 1776" 2219 is displayed in the Web document section while the tree text history entry of "Writing the Declaration of Independence, 1776" 2218 is simultaneously created subordinate to and at a sub-level immediately below the lastly created fifth level of the tree text history entry of "Thomas Jefferson Declaration of Independence-Gigablast Search Engine" 2216. In FIG. 13O, the user decides that this Web page 2219 is not useful and returns to the previous Web page by either clicking directly on the fifth level of the tree text history entry of "Thomas Jefferson Declaration of Independence-Gigablast Search Engine" 2216 from the tree text history section 2020, as shown in highlight or by using a backward navigation button 2006.

When the user selects another search result from the Web page 2217 displayed for "Thomas Jefferson Declaration of Independence-Gigablast Search Engine," a new Web page 2221 is displayed in the Web document section in FIG. 13P while the new tree text history entry of "Thomas Jefferson Papers: Declaration of Independence" 2220 is created at the same level as the lastly created sixth level 2218 immediately below the lastly created tree text history entry. In FIG. 13Q, the user decides to set a high priority by right clicking on the tree text history entry of "Thomas Jefferson Papers: Declaration of Independence" 2220 at which time the management menu box 2050 pops up to allow the user to select the "set priority" option 2053. By right clicking on the "set priority" option 2053 from the management menu box 2050, a dialog box 2055 pops up with the options of "high," "medium," or "low." As a result of setting the priority to be high for this tree text history entry 2220, the tree text history entry 2220 is bolded as shown in FIG. 13R.

In FIG. 13S, the user decides to return to the search results Web page for "Thomas Jefferson Declaration of Independence" by either selecting the relevant tree text history entry 2216 from the tree text history section 2020 or by using the backward navigation button 2006. With reference to FIG. 13T, the user adds an additional search term of "primary" from the search results Web page for "Thomas Jefferson Declaration of Independence" at which time the new Web page 2223 is displayed in the Web document section in FIG. 13T. Simultaneously, the tree text history entry of "Thomas Jefferson Declaration of Independence primary-Gigablast Search Engine" 2222 is created at the same level as the lastly created sixth level tree text history entry 2220. The context is currently set at "Thomas Jefferson Declaration of Independence primary." By selecting a link from the Web page 2223 as displayed from FIG. 13T, a new Web page of "Declaration of Independence-Thomas Jefferson Encyclopedia" is displayed 2225 in the Web document section in FIG. 13U and a tree text history entry 2224 simultaneously created subordinate to and immediately beneath the sixth level tree text history entry of "Declaration of Independence-Thomas Jefferson Encyclopedia" 2222 in the left hand tree text history section 2020.

Figure 14A:
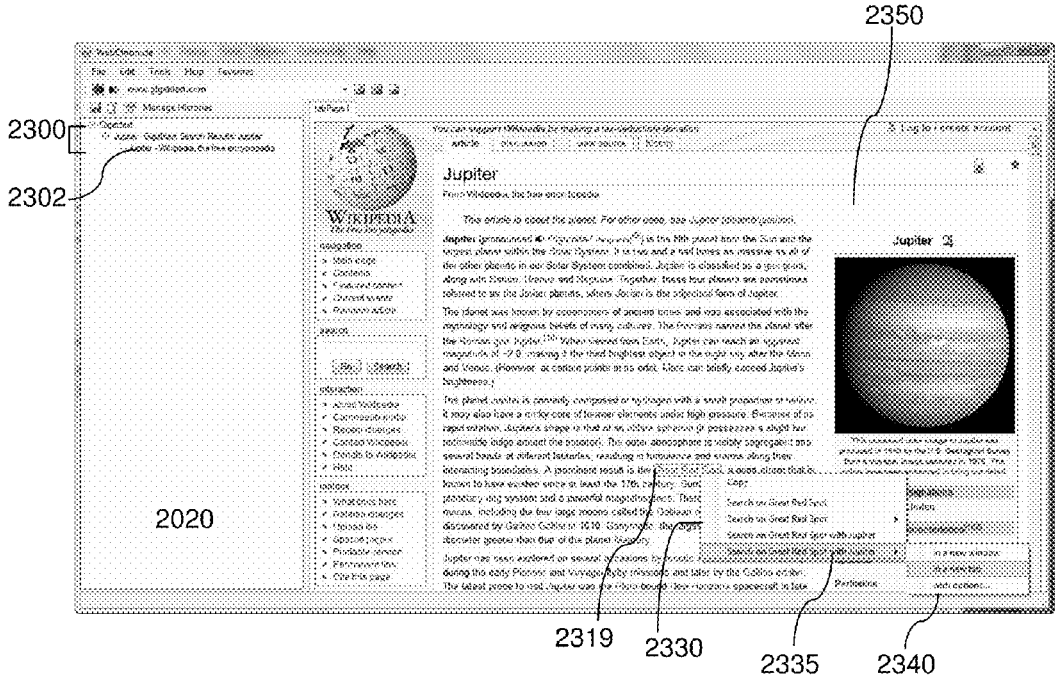
FIGS. 14A through 14C are screen shots illustrating an exemplary embodiment of implementing the steps of and consistent with the principles of the invention.
Figure 14B:
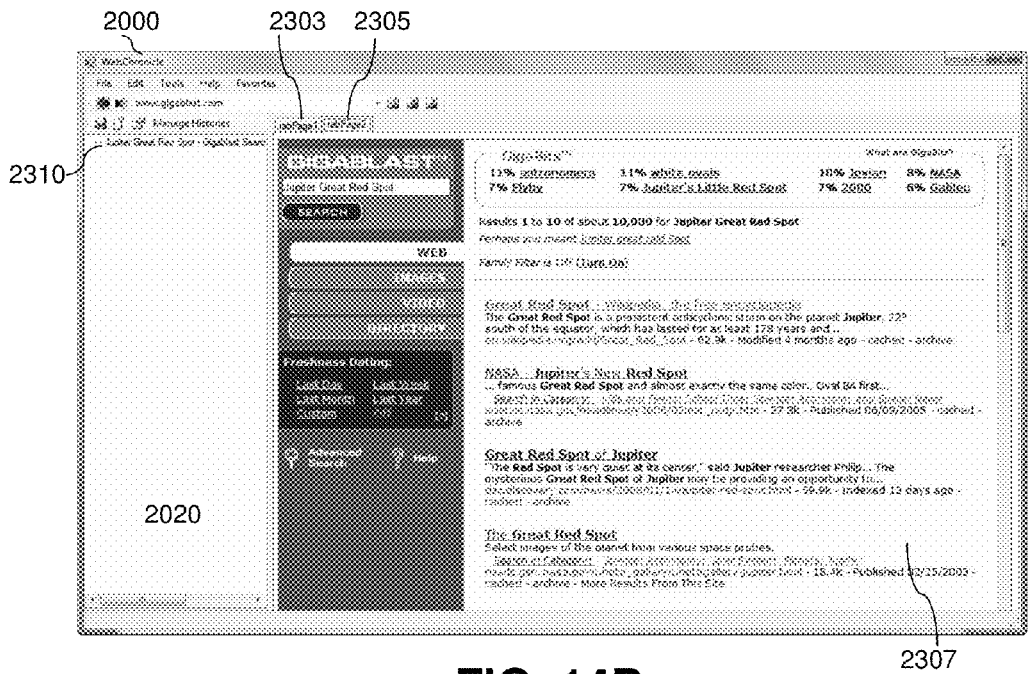
Figure 14C:
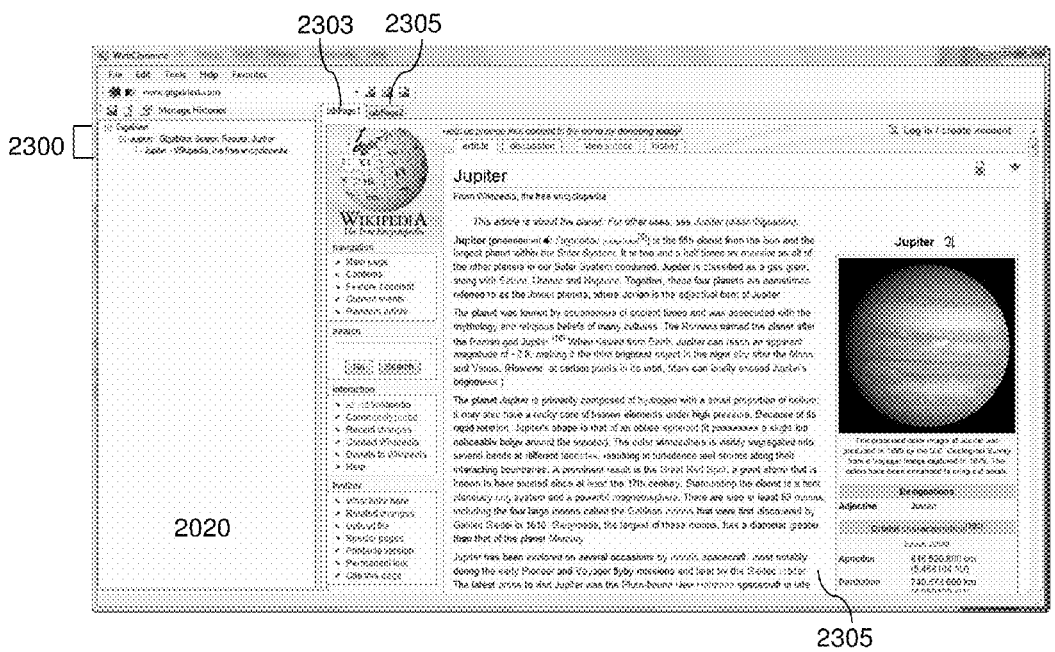

FIGS. 14A through 14C are screen shots illustrating an exemplary embodiment of implementing the steps of and consistent with the principles of the invention wherein a user can go back an forth between searches created under different tabs. In FIG. 14A, a user has conducted a search for the term "Jupiter." In the left hand tree text history section 2020, a set of three tree text history entries is displayed 2300 and the right hand Web document section displays the Web page for "Jupiter-Wikipedia the free encyclopedia" 2305 which corresponds to the most recent tree text history entry created 2310 from the set of tree text history entries 2300.

The user navigates to Wikipedia and decides to continue the search under the terms "Great Red Spot" in a new tab 2305. The user highlights the terms "Great Red Spot" 2319 from the "Jupiter" Web page 2305. By highlighting the terms "Great Red Spot," and right-clicking on the terms, a context menu 2330 pops up with four options of "Search on Great Red Spot," "Search on Great Spot" with further options, "Search on Great Red Spot with Jupiter," and "Search on Great Red Spot with Jupiter" with further options. The user decides to look at further options by right clicking on the fourth option of "Search on Great Red Spot with Jupiter" 2335, and the dialog box 2340 pops up. By selecting "in new tab" from the dialog box 2340, a new tab 2305 is created in FIG. 14B. As shown in FIG. 14B, the new tab or "tabPage2" 2305 displays the new Web page 2307 of "Great Red Spot with Jupiter" search results, and the tree text history entry for "Jupiter Great Red Spot-Gigablast Search Engine" 2302 is created in the left hand tree text history section 2020. In FIG. 14C, the user returns to the old context which is "Jupiter" in the first tab or "tabPage1" 2303 by clicking on the first tab or "tabPage1"

2303 and the corresponding Web page 2305 as previously shown in FIG. 14A. All linkages between the tabbed history data can be saved so that the history data can be searched and managed.

It should be noted that the present invention may be implemented on the World Wide Web service on the Internet or other analogous network service in an alternate network environment. The term Web server is meant to be broadly construed to be applicable to alternate network environments. Details of opening and maintaining a network connection, selecting the appropriate actions for various URIs, URLs, content negotiation, and transaction logging handled by the existing Web server system, however, are meant to be exemplary as such protocols may or may not be necessary in alternate network environments.

It should be noted that the present invention may be implemented using different types of devices including but not limited to computers (or other programmable apparatuses), workstations, handheld technical devices (i.e. Pocket PC® devices, Palm® devices), interactive televisions, kiosks, dedicated devices, processors (or groups of processors), general purpose devices, dedicated purpose devices, or virtually any current or future interactive technology device means, all of which are referred to in this specification as "computers." It should be noted that a method of the present invention may be encoded and/or stored on a computer/machine (or other device) —readable medium or tangible media including RAM, ROM, floppy disks, hard disks, or virtually any current or future memory and/or storage means, all of which are referred to in this specification as "memory."

It should be noted that the present invention may be implemented using or functioning on operating systems, including, but not limited to, Windows Vista®, Windows 95®, Windows 98®, Windows CE®, Windows Me®, Windows NT®, Windows2000®, Linux®, MacOS®, BeOS®, or virtually any current or future operating system means, all of which are referred to in this specification as "operating systems." It should be noted that the present invention may be implemented or programmed using languages including, but not limited to, C, C++, Turbo C, Fortran, Pascal, ADA, Java™ language, JavaScript®, Java Applet™ technology, Perl®, Smalltalk®, assembly language, HTML (i.e. Hypertext Markup Language), DHTML (i.e. Dynamic Hypertext Markup Language), XML (i.e. eXtensible Markup Language), XLS (i.e. eXtensible Style Language), SVG (i.e. Scalable Vector Graphics), VML (i.e. Vector Markup Language), Macromedia's Flash™ technology, or virtually any current or future programming language means, all of which are referred to in this specification as "programming languages." In any case, the programming language may be a compiled or interpreted language, and combined with hardware implementations. Further, various programming approaches such as procedural, object-oriented, or artificial intelligence techniques may be employed, depending on the requirements of each particular implementation.

It should be further noted that although the present invention is described in terms of data connections, the terms are not meant to be limiting. The terms "transmit" and "transmitting" are meant to include standard means of provision, but can also be used for non-traditional provisions as long as the data is "sent" or "received" (that can also mean obtained). The methods and apparatus of the present invention may also be practiced via communications embodied in the form of program code that is transmitted over some transmission medium, such as over electrical wiring or cabling, through fiber optics, or via any other form of transmission, wherein when the program code is received and loaded into and executed by a machine, the machine becomes an apparatus for practicing the invention. When implemented on a general-purpose processor, the program code combines with the processor to provide a unique apparatus that operates to invoke the functionality of the present invention. Additionally, any storage techniques used in connection with this present invention may invariably be a combination of hardware and software.

Although the present invention has been discussed in terms of the Internet, alternative media is also contemplated within the scope of the invention. For example, as shown in the exemplary embodiments discussed above, interactive television and wireless communication devices would be ideally suited to the method described in this disclosure. Further, although the terms "Web server," "Web site," and "Web page," are used throughout this disclosure, they are used in the generic sense and are not meant to exclude their equivalent as associated with intranets, LANs, WANs, or alternate media.

Thus, the present invention is presently embodied as methods, systems, computer program products or computer readable mediums encoding computer programs for saving and prioritizing web search results or histories.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method for managing history data in a tree text history management system during a web search by a user, comprising the steps of:
   (a) receiving a history data from the web search using a search term;
   (b) automatically creating a tree text history entry in a tree text history section by associating with the history data from the web search within the context of the search term;
   (c) repeating steps (a) through (b) and creating tree text history entries in the tree text history section by associating the history data from web searches using search terms in a hierarchical format;
   (d) managing the tree text history entries created in the tree text history section;
   (e) pulling up a context menu in one of the tree text history section and a web document section;
   (f) using the context menu for the web search within the context of the search term;
   (g) conducting at least one of a web search and a sub-search via the context menu; and
   (h) using a dialog box to select a display option for sub-search results;
   wherein the tree text history management system provides the user with the tree text history entries created within the context of the search terms that are reusable, modifiable, and manageable, and wherein the context menu is integrated with the tree text history management system.

2. The method of claim 1, wherein the tree text history management system comprises integrating with at least one of the Internet, Intranet, extranet, wide area network, local area network, wireless local area network, wireless network, bus, electronic, and optical communication configurations.

3. The method of claim 1, wherein the step of managing the tree text history entries comprises:
   pruning one or more of the tree text history entries.

4. The method of claim 3, wherein the step of pruning comprises sorting, modifying, deleting, filtering, prioritizing, or organizing the one or more of the tree text history entries according to user preferences.

5. The method of claim 1, wherein the step of managing the tree text history entries comprises:
   exporting the tree text history entries for storing the tree text history entries for later use.

6. The method of claim 1 or 5, wherein the step of managing the tree text history entries comprises:
   adding notes to one or more of the tree text history entries before storing the tree text history entries.

7. The method of claim 1, wherein the step of managing the tree text history entries comprises:
   importing the tree text history entries from a previous search.

8. The method of claim 1, wherein the step of managing the tree text history entries comprises:
   searching within the tree text history entries using at least one search term.

9. The method of claim 1, wherein the step of managing the tree text history entries comprises:
   accessing at least one of a history management dialog box, window, and page.

10. The method of claim 1, wherein the step of managing the tree text history entries comprises:
    providing a playback functionality.

11. A method for managing web history data in a tree text history management system during searches by a user, comprising the steps of:
    (a) receiving a history data from a first search using a search term;
    (b) automatically creating a first level tree text history entry in a tree text history section by associating with the history data from the search within the context of the search term;
    (c) receiving a second history data from the first search using the search term;
    (d) automatically creating a second level tree text history entry in the tree text history section by associating with the second history data from the first search within the context of the search term;
    (e) receiving a third history data from the first search using a sub-search term;
    (f) automatically creating a third level tree text history entry in the tree text history section by associating with the third history data from the first search within the context of the sub-search term;
    (g) repeating steps (e) through (f) and creating the tree text history entries in a hierarchical format by associating with the history data in the first search;
    (h) receiving history data from a second search using a second search term;
    (i) managing the tree text history entries created in the first search and the second search;
    (j) pulling up a context menu in one of the tree text history section and a web document section;
    (k) using the context menu for at least one of the first search and the second search within the context of at least one of the first search term and the second search term;
    (l) conducting at least one of a search and a sub-search via the context menu; and
    (m) using a dialog box to select a display option for sub-search results;
    wherein the tree text history management system provides the user with tree text history entries that are reusable, modifiable, and manageable.

12. The method of claim 11, wherein the step of managing the tree text history entries comprises pruning, sorting, modifying, deleting, filtering, organizing, refining, or prioritizing one or more of the tree text history entries.

13. The method of claim 11, wherein the step of managing the tree text history entries comprises:
    exporting the tree text history entries in a usable format for storing the tree text history entries for future use.

14. The method of claim 11 or 13, wherein the step of managing the tree text history entries comprises:
    adding notes to one or more of the tree text history entries before storing the tree text history entries.

15. The method of claim 11, wherein the step of managing the tree text history entries comprises:
    importing any tree text history entries from a previous search.

16. The method of claim 11, wherein the step of managing the tree text history entries comprises:
    searching within the tree text history entries using at least one search term.

17. The method of claim 11, wherein the step of managing the tree text history entries comprises:
    accessing at least one of a history management dialog box, window, and page.

18. The method of claim 11, wherein the step of managing the tree text history entries comprises:
    providing a playback functionality.

19. A tree text web history management system for managing automatically created tree text history entries during a web search by a user with a server connected to a client comprising:
    a tree text history section having the tree text history entries, wherein the tree text history entries are repeatedly created in a hierarchical format based at least in part on an association with history data received from at least one of a web search and a sub-search conducted using a context menu pulled up in one of the tree text history section and a web document section and within the context of a search term and using a dialog box to select a display option for any sub-search results;
    a computer program in the client for executing instructions to create and manage the tree text history entries within the tree text history section;
    a server for retrieving and transmitting history data requested from the client; and
    wherein the tree text history management system provides tree text history entries that are reusable, modifiable, and manageable, and wherein the context menu is integrated with the tree text history management system.

20. The tree text web history management system of claim 19 further comprising integration with at least one of the Internet, Intranet, extranet, wide area network, local area network, wireless local area network, wireless network, bus, electronic, and optical communication configurations.

21. The tree text web history management system of claim 19, wherein the computer program is a browser add-on.

22. The tree text web history management system of claim 19, wherein the computer program is a component of a browser software.

23. The tree text web history management system of claim 19, wherein the computer program is a browser plug-in.

24. The tree text web history management system of claim 19, wherein the computer program is a browser wrapper.

25. The tree text web history management system of claim 19, wherein the computer program is an external server.

26. A computer-readable storage medium having executable instructions for causing a client to manage web history data and use context menus pulled up in one of a tree text history section and a web document section and within the context of a search term during at least one of a search and a sub-search by a user and use a dialog box to select a display option for any sub-search results, the client comprising computer-readable program code for causing the client to:

(a) connect with a server in a web environment;
(b) request search results from the server;
(c) receive search results from the server;
(d) automatically and repeatedly create tree text history entries in the tree text history section in a hierarchical format by associating with the web history data received from the at least one of the search and the sub-search within the context of the search term; and
(e) store the tree text history entries in a memory;

wherein the tree text history management system provides the user with tree text history entries created within the context of the search terms that are reusable, modifiable, and manageable, and wherein the context menu is integrated with the tree text history management system.

27. The computer-readable storage medium of claim 26, wherein the computer-readable program code is a browser add-on.

28. The computer-readable storage medium of claim 26, wherein the computer-readable program code is a component of a browser software.

29. The computer-readable storage medium of claim 26, wherein the computer-readable program code is a browser plug-in.

30. The computer-readable storage medium of claim 26, wherein the computer-readable program code is a browser wrapper.

31. The computer-readable storage medium of claim 26, wherein the computer-readable program code is an external server.

32. The computer-readable storage medium of claim 26, further comprising computer-readable program code for providing at least one of a history management dialog box, window, and page.

33. The computer-readable storage medium of claim 26, further comprising computer-readable program code for providing a playback functionality.

* * * * *